US009944457B2

(12) United States Patent
Bowser

(10) Patent No.: US 9,944,457 B2
(45) Date of Patent: *Apr. 17, 2018

(54) MODULAR SHIPPING CONTAINER, SYSTEM, AND METHOD

(71) Applicant: Bruce Douglas Bowser, Mississauga (CA)

(72) Inventor: Bruce Douglas Bowser, Mississauga (CA)

(*) Notice: Subject to any disclaimer, the term of this patent is extended or adjusted under 35 U.S.C. 154(b) by 686 days.

This patent is subject to a terminal disclaimer.

(21) Appl. No.: 14/553,383

(22) Filed: Nov. 25, 2014

(65) Prior Publication Data

US 2016/0145039 A1 May 26, 2016

(51) Int. Cl.
| | |
|---|---|
| *B65D 90/00* | (2006.01) |
| *B65D 88/00* | (2006.01) |
| *B60P 1/64* | (2006.01) |
| *B65D 88/02* | (2006.01) |
| *B65D 88/12* | (2006.01) |

(52) U.S. Cl.
CPC .......... *B65D 88/005* (2013.01); *B60P 1/6481* (2013.01); *B65D 88/022* (2013.01); *B65D 90/008* (2013.01); *B65D 88/121* (2013.01)

(58) Field of Classification Search
CPC .... B65D 90/008; B65D 88/12; B65D 88/022; B65D 88/005; B60P 1/6481
USPC .................................................... 49/57, 463
See application file for complete search history.

(56) References Cited

U.S. PATENT DOCUMENTS

| | | | |
|---|---|---|---|
| 2,715,040 A | 8/1955 | Rhoads | |
| 2,761,581 A | 9/1956 | Cohee | |
| 2,920,781 A | 1/1960 | Butcher et al. | |
| 3,004,682 A | 10/1961 | Bertolini et al. | |
| 3,015,407 A | 1/1962 | Fesmire et al. | |
| 3,061,134 A | 10/1962 | Fesmire et al. | |
| 3,073,466 A | 1/1963 | Greer et al. | |
| 3,485,406 A * | 12/1969 | Borden ............... | E06B 3/86 220/1.5 |
| 3,561,634 A | 2/1971 | Meldrum | |
| 3,593,672 A | 7/1971 | Breen et al. | |
| 3,752,349 A | 8/1973 | Rana | |
| 3,907,148 A | 9/1975 | Meller et al. | |

(Continued)

FOREIGN PATENT DOCUMENTS

| | | | | |
|---|---|---|---|---|
| DE | 3600378 A1 * | 7/1987 | ............ | B65D 88/12 |
| DE | 3600378 C2 * | 5/1988 | ............ | B65D 88/12 |
| WO | 93/10023 A1 | 5/1993 | | |

*Primary Examiner* — Anthony Stashick
*Assistant Examiner* — Mollie Impink
(74) *Attorney, Agent, or Firm* — Renner, Otto, Boisselle & Sklar, LLP

(57) ABSTRACT

A modular shipping container, comprising: an enclosure having a base opposed and spaced from a roof, each of the base and roof coupled to respective ends of opposed and spaced left and right side walls and to opposed and spaced front and back walls, the front and back walls having front and back door openings formed therein, respectively; and, front and back doors sized for mounting over the front and back door openings, respectively, to selectively close the front and back door openings; wherein the front door opening and the front door are smaller than the back door opening and the back door, respectively, whereby the front door is passable through the back door opening.

22 Claims, 46 Drawing Sheets

(56) References Cited

U.S. PATENT DOCUMENTS

| | | | |
|---|---|---|---|
| 3,915,327 A * | 10/1975 | Lovich | B62D 33/04 217/62 |
| 4,177,907 A | 12/1979 | Funaioli et al. | |
| 4,214,669 A | 7/1980 | McQuiston | |
| 4,302,044 A * | 11/1981 | Sims | B60J 7/141 105/378 |
| 4,726,149 A * | 2/1988 | Tryba | E06B 9/02 49/465 |
| 4,819,820 A | 4/1989 | Weiner | |
| 5,052,569 A | 10/1991 | Cooper | |
| 5,192,176 A | 3/1993 | Roberts | |
| 5,199,589 A | 4/1993 | Noble | |
| 5,289,933 A | 3/1994 | Streich et al. | |
| 5,326,212 A | 7/1994 | Roberts | |
| 5,326,213 A | 7/1994 | Roberts | |
| 5,501,333 A | 3/1996 | Swan | |
| 5,601,201 A * | 2/1997 | Looker | B65D 88/005 160/273.1 |
| 5,611,449 A | 3/1997 | Pedersen | |
| 5,662,450 A | 9/1997 | Roberts | |
| 5,829,595 A | 11/1998 | Brown et al. | |
| 5,904,262 A | 5/1999 | Coppi | |
| 6,010,021 A | 1/2000 | Zuidam et al. | |
| 6,071,062 A | 6/2000 | Warhurst et al. | |
| 6,089,398 A * | 7/2000 | Weinstein | B65D 88/14 220/324 |
| 6,155,770 A | 12/2000 | Warhurst | |
| 6,299,008 B1 | 10/2001 | Payne | |
| 6,363,586 B1 | 4/2002 | Neufingerl | |
| 6,415,938 B1 | 7/2002 | Karpisek | |
| 6,811,048 B2 | 11/2004 | Lau | |
| 7,185,779 B2 | 3/2007 | Payne | |
| 7,296,704 B2 | 11/2007 | Ferrini | |
| 7,357,611 B2 | 4/2008 | Faivre et al. | |
| 7,811,044 B2 | 10/2010 | Warhurst | |
| 8,100,279 B2 | 1/2012 | Nielsen et al. | |
| 8,128,327 B2 | 3/2012 | Jevaney | |
| 8,308,018 B2 | 11/2012 | Kochanowski | |
| 8,376,168 B2 | 2/2013 | Fielden | |
| 8,794,480 B2 | 8/2014 | Gollnick et al. | |
| 2001/0035410 A1 | 11/2001 | Taube et al. | |
| 2007/0108204 A1 | 5/2007 | Warhurst et al. | |
| 2009/0026196 A1 | 1/2009 | Leedekerken | |
| 2009/0078700 A1 | 3/2009 | Boivin | |
| 2009/0145897 A1 | 6/2009 | Chen | |
| 2010/0147842 A1 | 6/2010 | Reynard et al. | |
| 2010/0191615 A1 | 7/2010 | Thomas | |

* cited by examiner

SECTION T-T

MODULAR SHIPPING CONTAINER, SYSTEM, AND METHOD

FIELD OF THE APPLICATION

This application relates to the field of shipping containers, and more specifically, to a modular shipping container, system, and method.

BACKGROUND

The efficient, safe, and secure shipment of freight, such as goods, components, products, mail, etc. is an important aspect of business today. Freight is often shipped nationally and internationally by truck, train, ship, and airplane. Before the freight reaches its destination, it is often handled by several different entities, such as trucking companies, intermediate consolidators, railways, shipping companies, and airlines.

One problem with present systems and methods for shipping freight is that they typically involve the complex and inefficient transfer and repackaging of freight before it is received by end users. For example, items of freight are typically picked up by one entity and brought to a transfer point where the goods are consolidated with other freight into boxes or containers. These boxes and containers, often containing freight for a variety of different end users, are then shipped by land, sea, or air to another site where the items are unconsolidated, reloaded, and then delivered to the end users. Throughout this process, different entities have control of the freight which increases the likelihood of mishandling or error. This complex process results in inefficiency and added expense. It also increases the likelihood of damage to or loss of the freight as it is transported to the end user.

A need therefore exists for an improved shipping container, system, and method. Accordingly, a solution that addresses, at least in part, the above and other shortcomings is desired.

SUMMARY OF THE INVENTION

According to one aspect of the application, there is provided a modular shipping container, comprising: an enclosure have a base opposed and spaced from a roof, each of the base and roof coupled to respective ends of opposed and spaced left and right side walls and to opposed and spaced front and back walls, the front and back walls having front and back door openings formed therein, respectively; and, front and back doors sized for mounting over the front and back door openings, respectively, to selectively close the front and back door openings; wherein the front door opening and the front door are smaller than the back door opening and the back door, respectively, whereby the front door is passable through the back door opening.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain structures, techniques and methods have not been described or shown in detail in order not to obscure the application.

Figure 1:
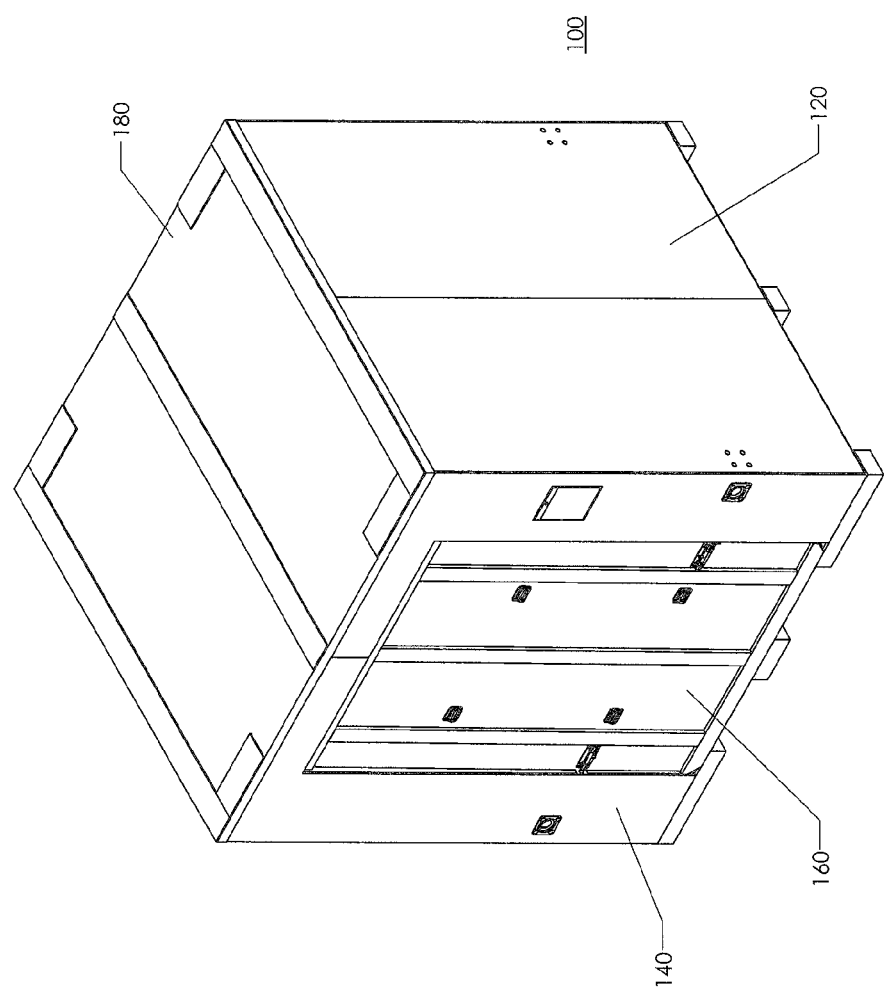
FIG. 1 is a front perspective view illustrating a modular shipping container in accordance with an embodiment of the application.
Figure 2:
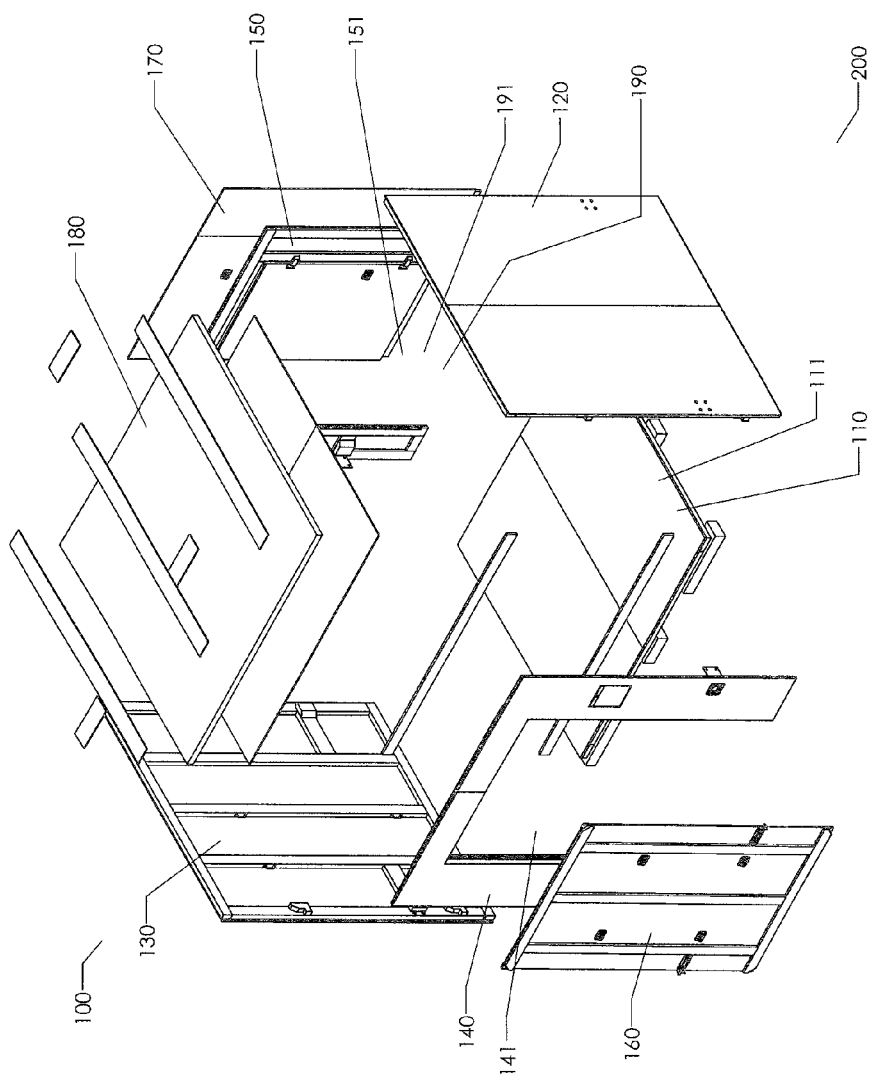
FIG. 2 is an exploded view illustrating the modular shipping container of FIG. 1 in accordance with an embodiment of the application.

FIG. 1 is a front perspective view illustrating a modular shipping container 100 in accordance with an embodiment of the application. And, FIG. 2 is an exploded view illustrating the modular shipping container 100 of FIG. 1 in accordance with an embodiment of the application.

According to one embodiment, the modular shipping container (or shipping container or container) 100 includes: a base 110; opposed right and left side walls (or first and second side walls) 120, 130 coupled (or joined or fastened) to the base 110; opposed front and back walls (or first and second end walls) 140, 150 coupled to the base 110, the front and back walls 140, 150 having front and back door openings (or first and second openings) 141, 151 formed therein, respectively, for the loading and removal of freight (not shown) from the shipping container 100; a roof 180 coupled to the right and left side walls 120, 130 and to the front and back walls 140, 150; and, front and back doors (or first and second closure panels) 160, 170 sized for mounting over the front and back door openings 141, 151, respectively, to selectively close the front and back door openings 141, 151 to secure the freight within the shipping container 100. The front door opening 141 and the front door 160 may be sized smaller than the back door opening 151 and the back door 170, respectively, to allow the front door 160 to be passed through the back door opening 151.

The modular shipping container 100 may be used for transporting and storing freight which may be placed on the upper surface 111 of the base 110 within the volume 190 or enclosure 191 defined by the base 110, side walls 120, 130, end walls 140, 150, and roof 180 (i.e., inside 190 the shipping container 100). According to one embodiment, the shipping container 100 may be constructed using wood, plastic, fibreglass, and/or metal.

Figure 3:
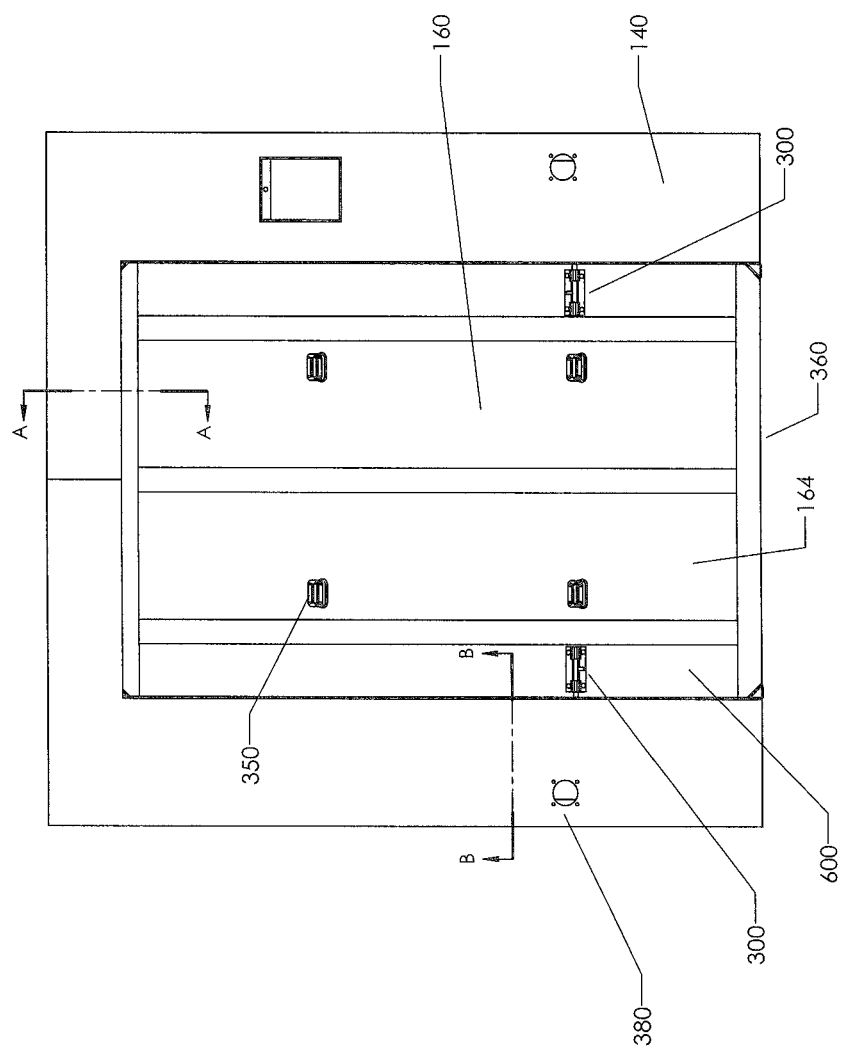
FIG. 3 is a front view illustrating the front wall of the shipping container of FIG. 1 in accordance with an embodiment of the application.
Figure 4:
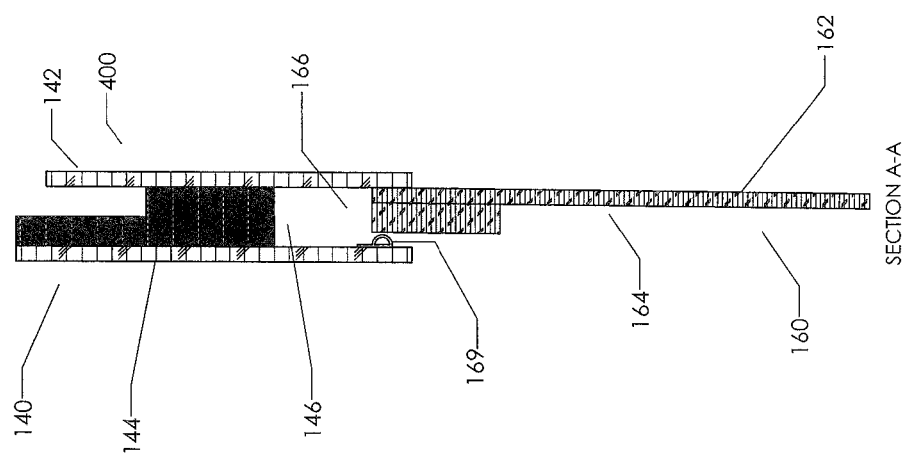
FIG. 4 is a cross-sectional view taken along line A-A in FIG. 3.
Figure 5:
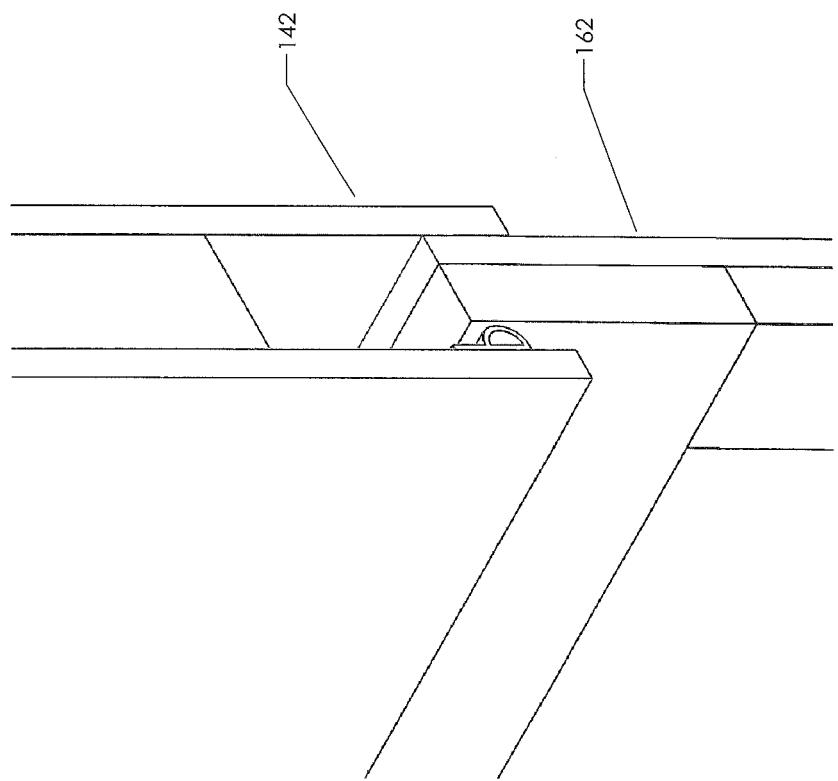
FIG. 5 is a perspective view of the cross-sectional view of FIG. 4.
Figure 6:
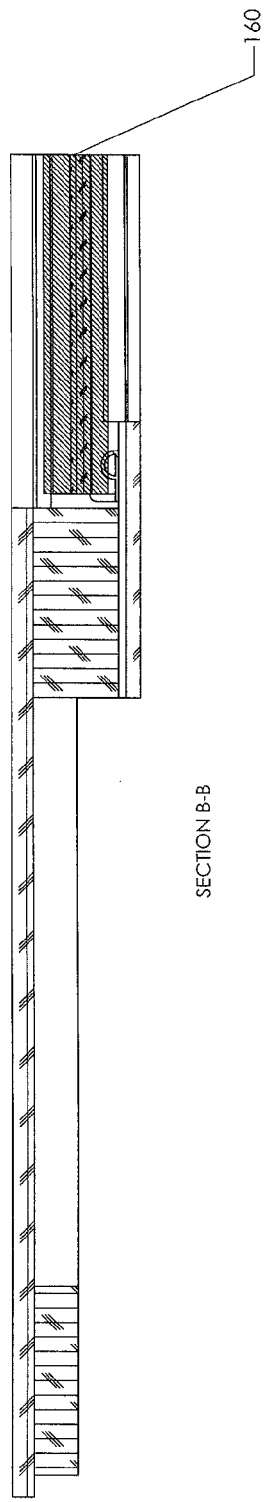
FIG. 6 is a cross-sectional view taken along line B-B in FIG. 3.
Figure 7:
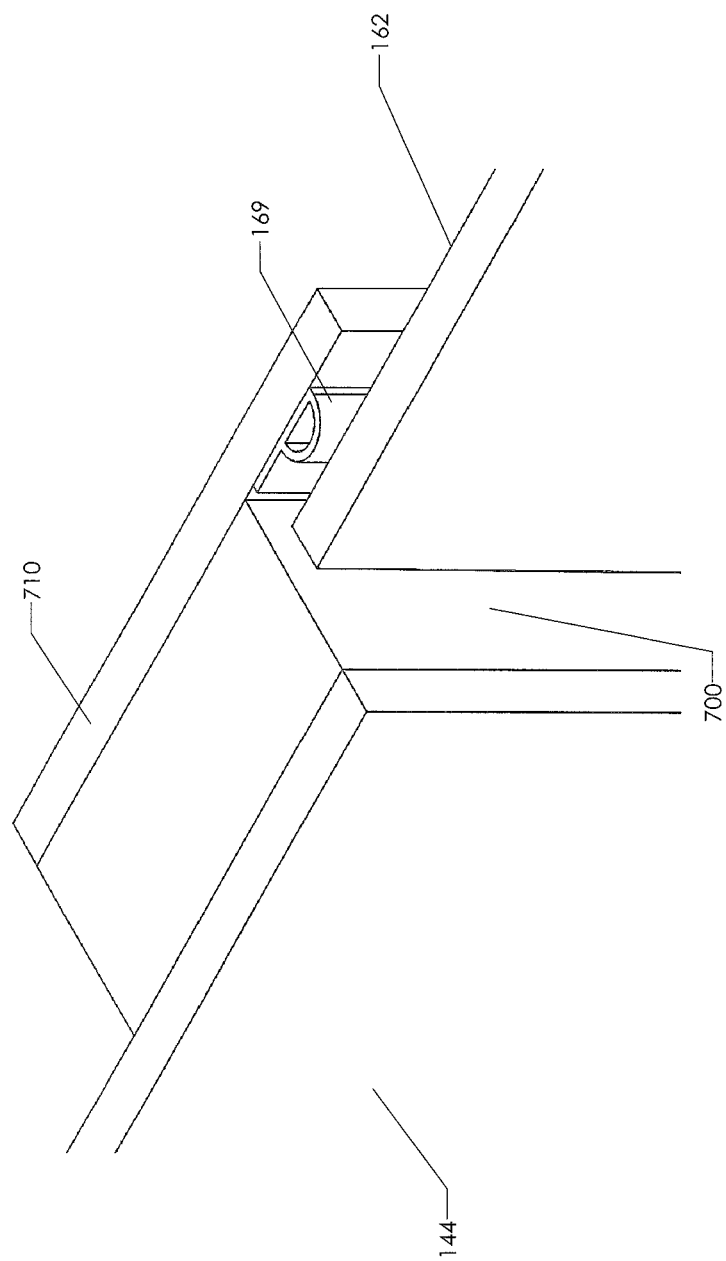
FIG. 7 is a perspective view of the cross-sectional view of FIG. 6.
Figure 8:
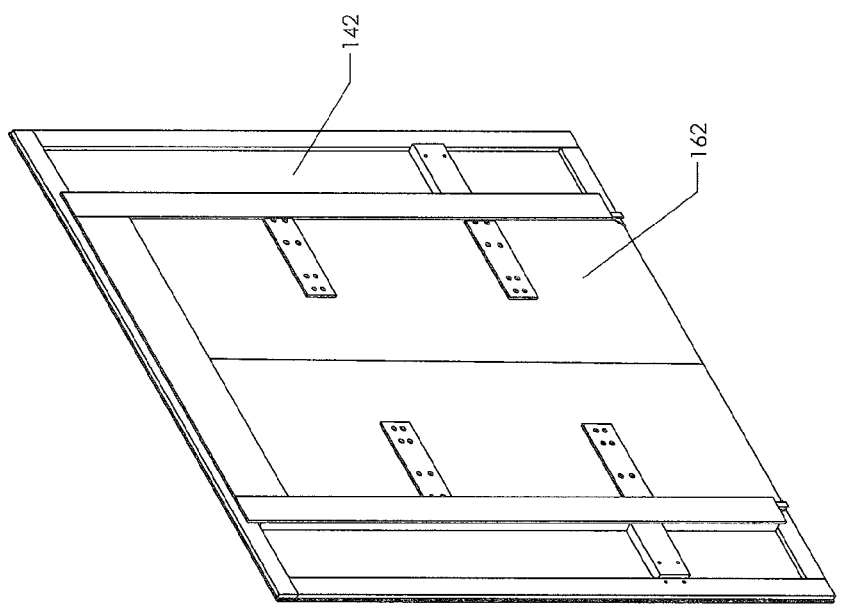
FIG. 8 is a rear perspective view illustrating the front wall of FIG. 3 in accordance with an embodiment of the application.
Figure 9:
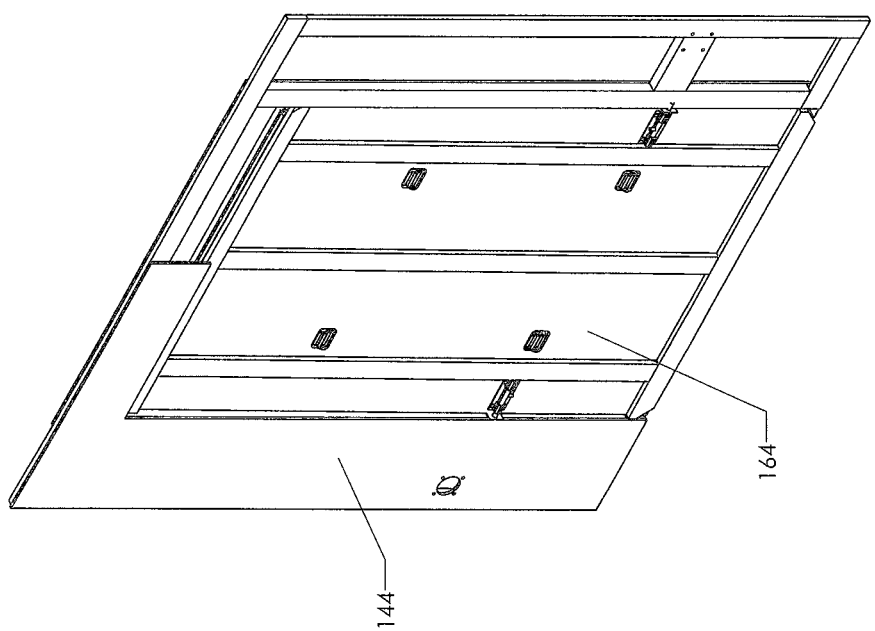
FIG. 9 is a front perspective partially broken-away view illustrating the front wall of FIG. 3 in accordance with an embodiment of the application.
Figure 10:
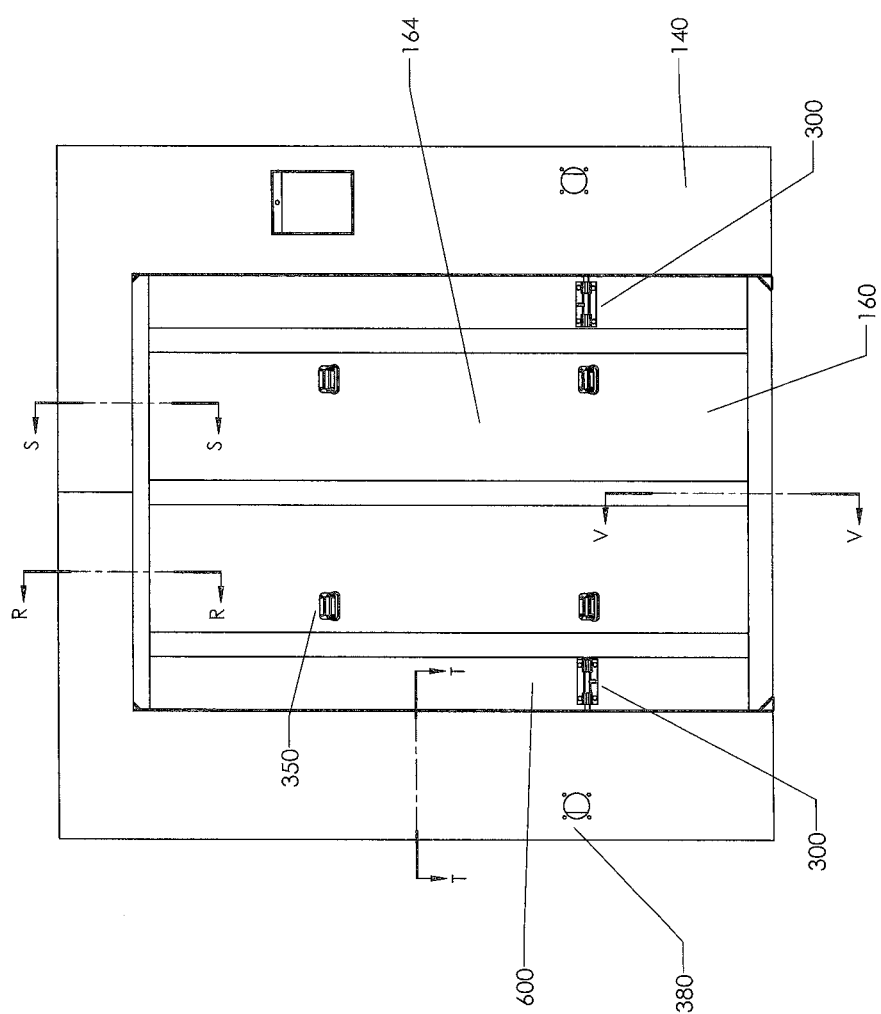
FIG. 10 is alternate front view illustrating the front wall of FIG. 3 in accordance with an embodiment of the application.
Figure 11:
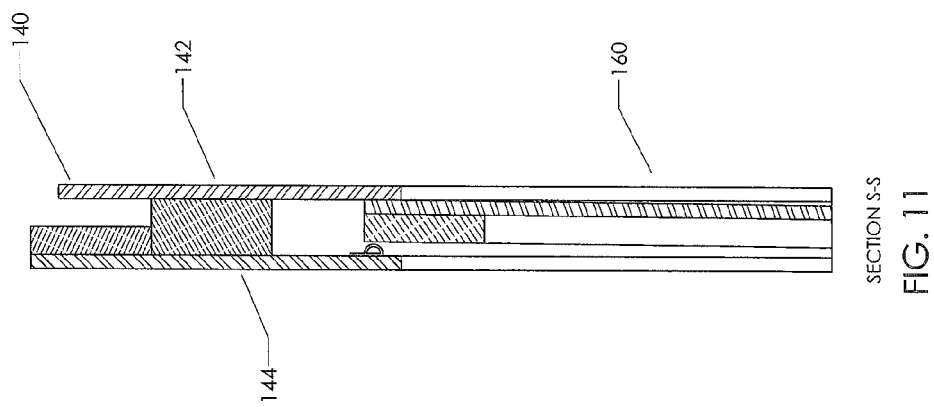
FIG. 11 is an alternate cross-sectional view taken along line S-S in FIG. 10.
Figure 12:
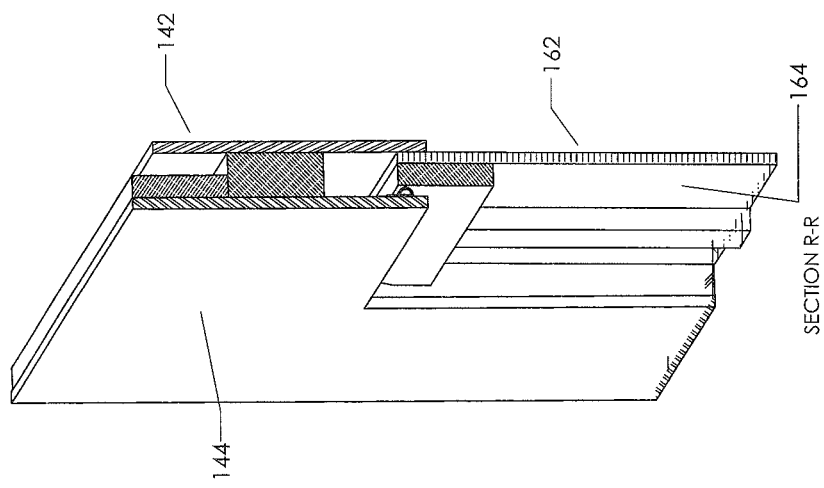
FIG. 12 is a cross-sectional view taken along line R-R in FIG. 10.
Figure 13:
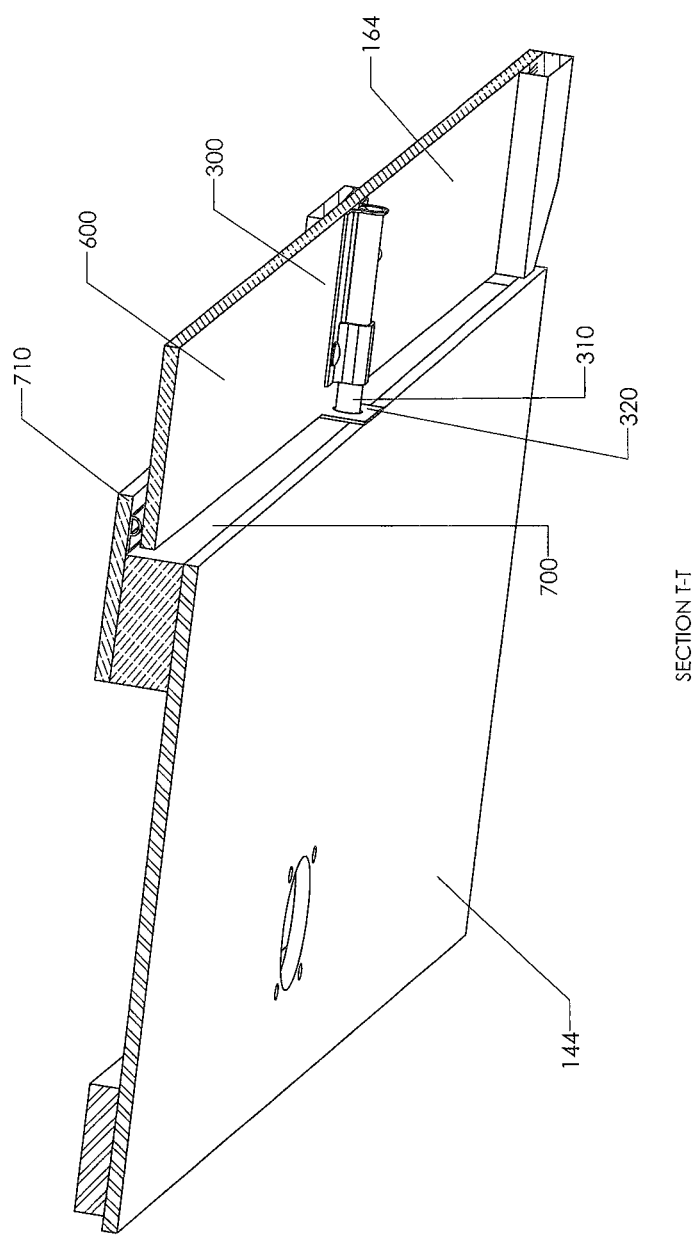
FIG. 13 is a cross-sectional view taken along line T-T in FIG. 10.
Figure 14:
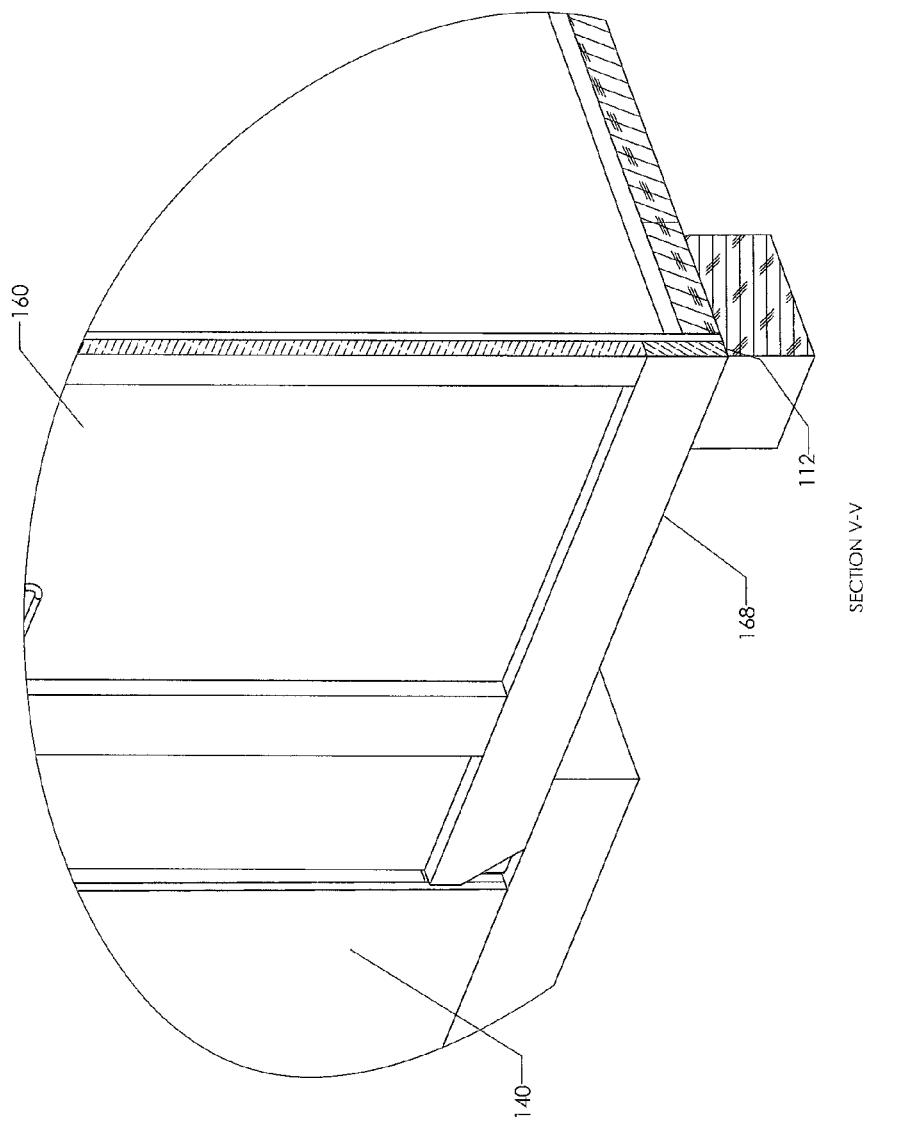
FIG. 14 is a cross-section view taken along line V-V in FIG. 10.
Figure 15:
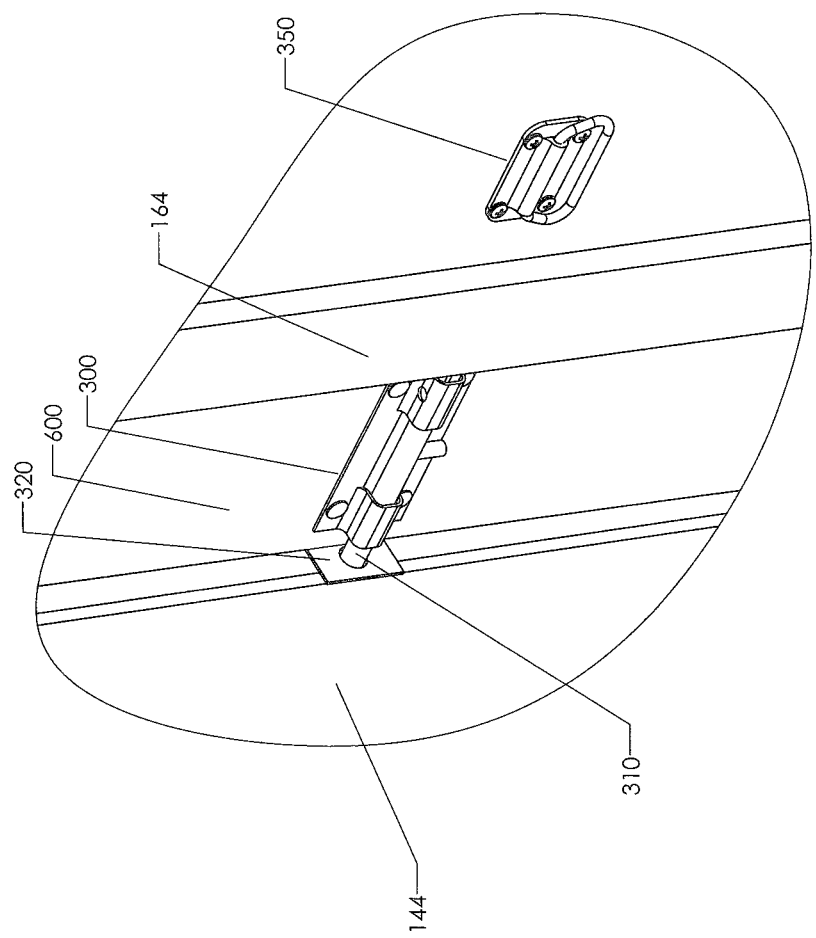
FIG. 15 is a detail view illustrating the handles and slide bolt latches shown in FIG. 10 in accordance with an embodiment of the application.

FIG. 3 is a front view illustrating the front wall 140 of the shipping container 100 of FIG. 1 in accordance with an embodiment of the application. FIG. 4 is a cross-sectional view taken along line A-A in FIG. 3. FIG. 5 is a perspective view of the cross-sectional view of FIG. 4. FIG. 6 is a cross-sectional view taken along line B-B in FIG. 3. FIG. 7 is a perspective view of the cross-sectional view of FIG. 6. FIG. 8 is a rear perspective view illustrating the front wall 140 of FIG. 3 in accordance with an embodiment of the application. FIG. 9 is a front perspective partially broken-away view illustrating the front wall 140 of FIG. 3 in accordance with an embodiment of the application. FIG. 10 is alternate front view illustrating the front wall 140 of FIG. 3 in accordance with an embodiment of the application. FIG. 11 is an alternate cross-sectional view taken along line S-S in FIG. 10. FIG. 12 is a cross-sectional view taken along line R-R in FIG. 10. FIG. 13 is a cross-sectional view taken along line T-T in FIG. 10. FIG. 14 is a cross-section view taken along line V-V in FIG. 10. And, FIG. 15 is a detail view illustrating the handles 350 and slide bolt latches 300 shown in FIG. 10 in accordance with an embodiment of the application.

The front wall 140 of the shipping container 100 may be rectangular in shape having an inner surface 142 facing the inside 190 of the container 100 and an outer surface 144 facing the outside 200. Similarly, the front door 160 may be rectangular in shape having an inner surface 162 facing the inside 190 of the container 100 and an outer surface 164 facing the outside 200. Similarly, the front door opening 141 may be rectangular in shape. According to other embodiments, the front door 160 and front door opening 141 may be square in shape, circular in shape, or any other shape.

The front door 160 is mounted over the front door opening 141 in the front wall 140 to close the front door opening 141 from outside 200 the shipping container 100 by first fitting an upper edge 166 of the front door 160 into a slot 146 formed in the front wall 140 above the front door opening 141 (i.e., in the front door lintel 400) and then resting a lower edge 168 of the front door 160 on a ledge 112 formed in the upper surface 111 of the base 110 below the front door opening 141. (i.e., at the front door sill 360).

A user or users may position the front door 160 in place using one or more handles 350 (e.g., four handles 350) mounted on the outer surface 164 of the front door 160. The front door 160 is secured or locked in place over the front door opening 141 using one or more slide bolt latches 300 (e.g., two slide bolt latches) mounted along the border or edges 600 of the outer surface 164 of the front door 160. The bolt 310 of each slide bolt latch 300 engages a respective strike plate or hole 320 mounted on or formed in the front wall 140 (e.g., in the doorjamb 700) adjacent each slide bolt latch 300.

A bump seal or seals 169 may be provided along doorstops 710 mounted to respective doorjambs 700 of the front wall 140 at the front door opening 141 and/or along the edge or spaced from the edge of the slot 146 formed in the lintel 400 to seal the front door 160 to the front wall 140 (i.e., to the front doorjambs 700, front door lintel 400, and front door sill 360).

Figure 16:
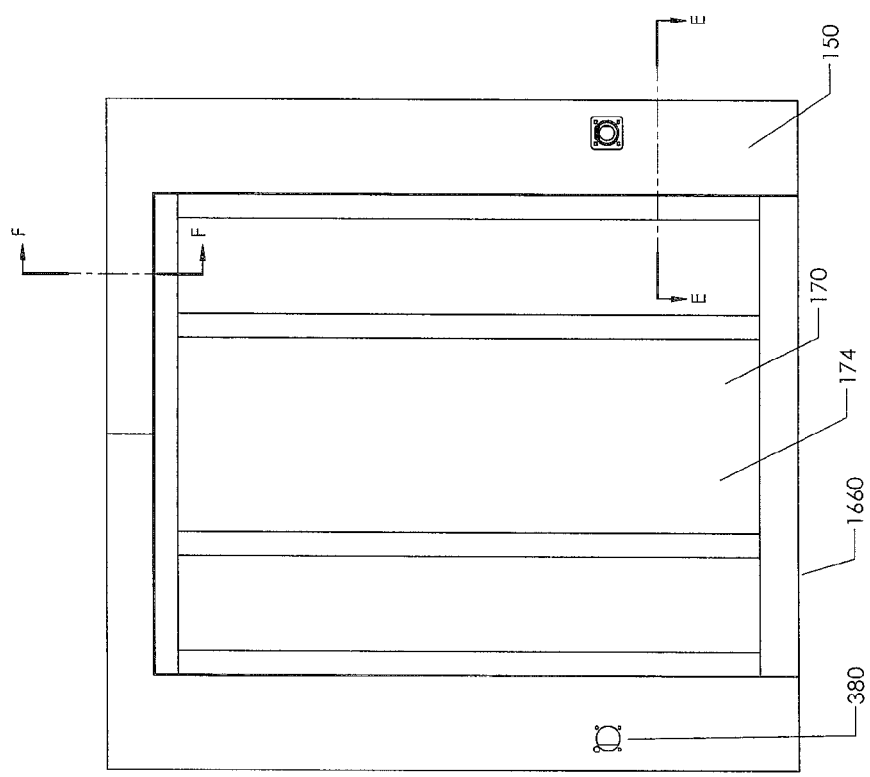
FIG. 16 is a front view illustrating the back wall of the shipping container of FIG. 1 in accordance with an embodiment of the application.
Figure 16A:
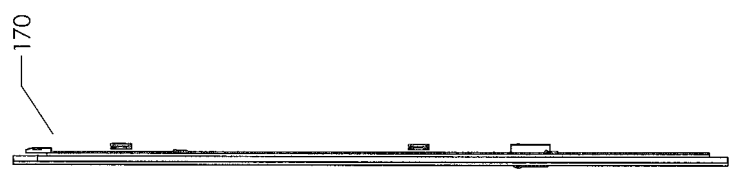
FIG. 16A is a side view illustrating the back wall of the shipping container of FIG. 1 in accordance with an embodiment of the application.
Figure 17:
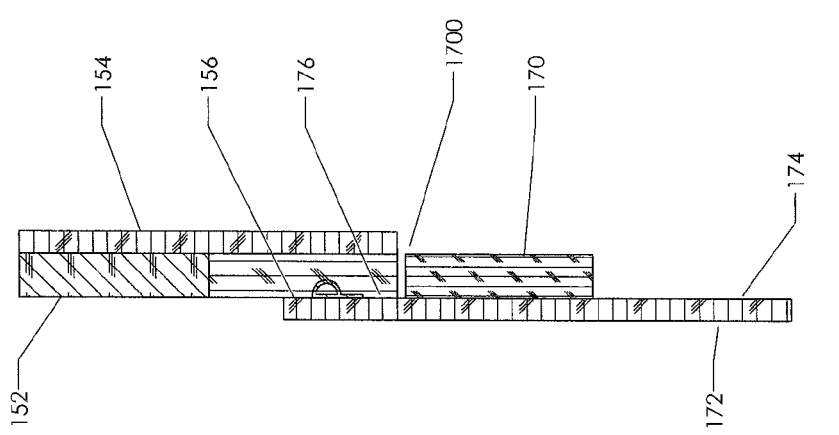
FIG. 17 is a cross-sectional view taken along line F-F in FIG. 16.
Figure 18:
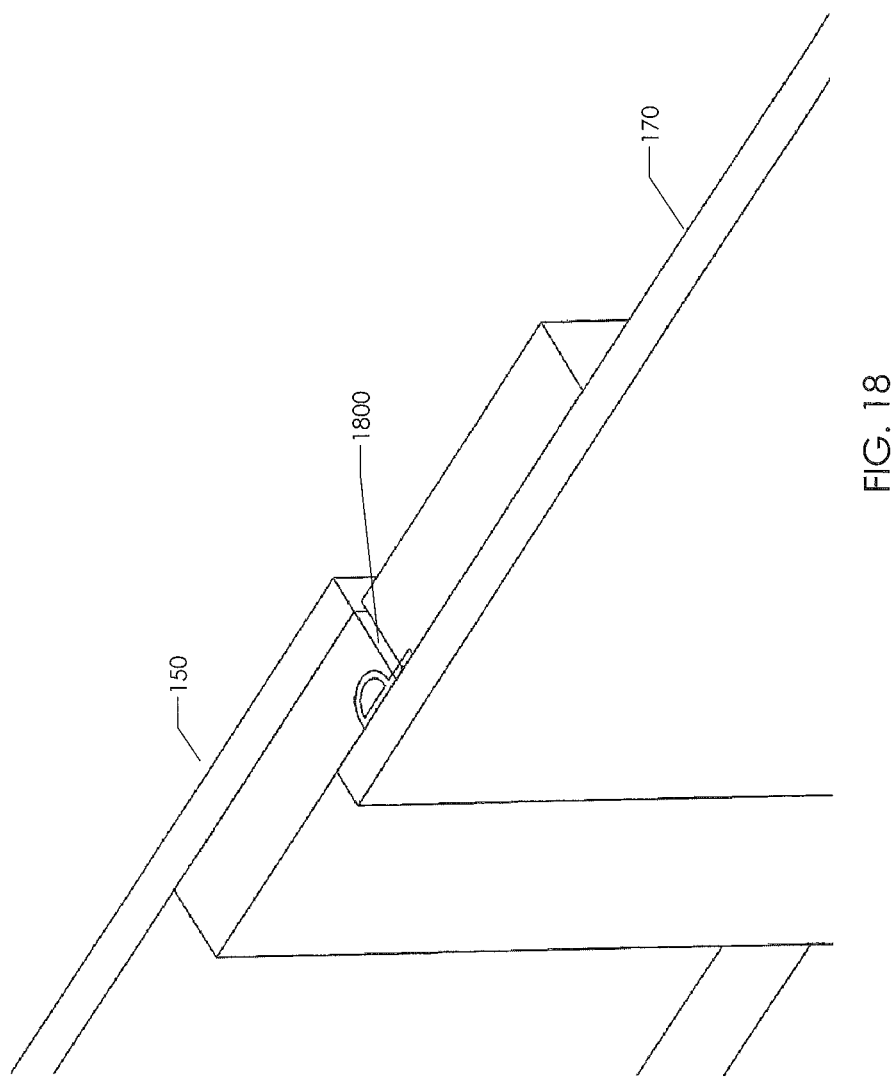
FIG. 18 is a detail view illustrating the seal shown in FIG. 17 in accordance with an embodiment of the application.
Figure 19:
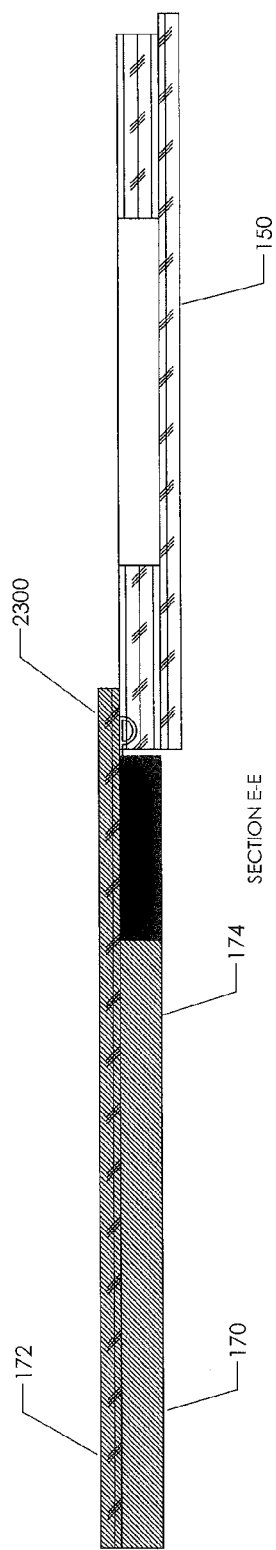
FIG. 19 is a cross-sectional view taken along line E-E in FIG. 16.
Figure 20:
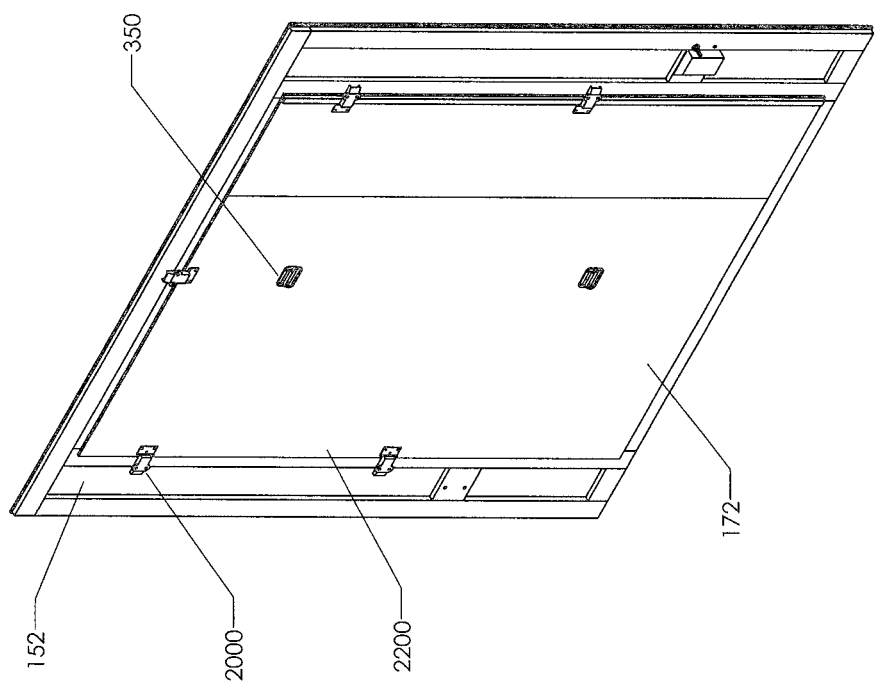
FIG. 20 is a rear perspective view illustrating the back wall of FIG. 16 in accordance with an embodiment of the application.
Figure 21:
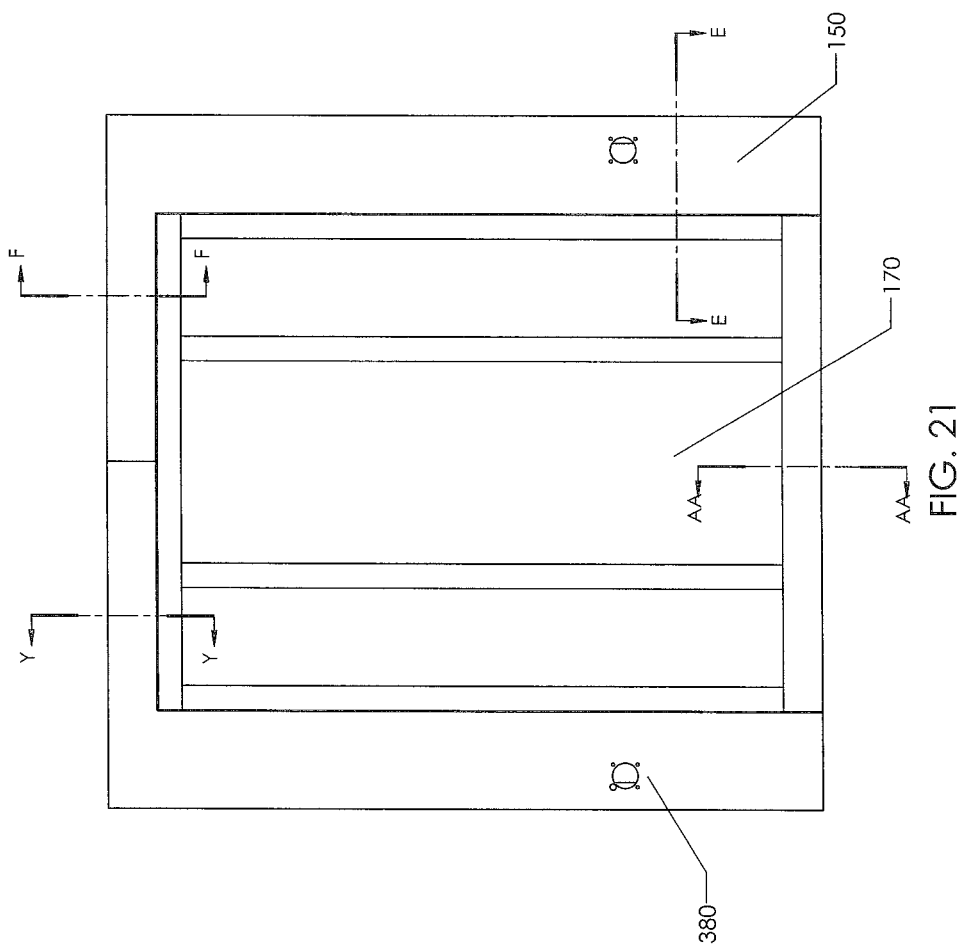
FIG. 21 is alternate front view illustrating the back wall of FIG. 16 in accordance with an embodiment of the application.
Figure 22:
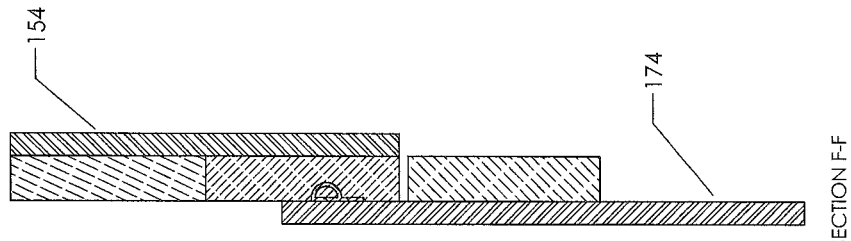
FIG. 22 is a cross-sectional view taken along line F-F in FIG. 21.
Figure 23:
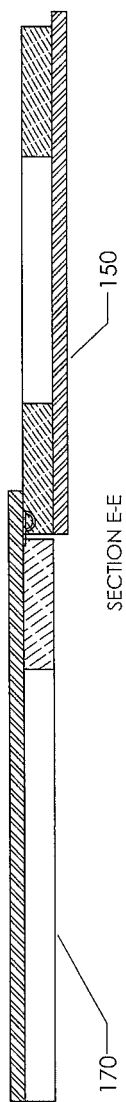
FIG. 23 is a cross-sectional view taken along line E-E in FIG. 21.
Figure 24:
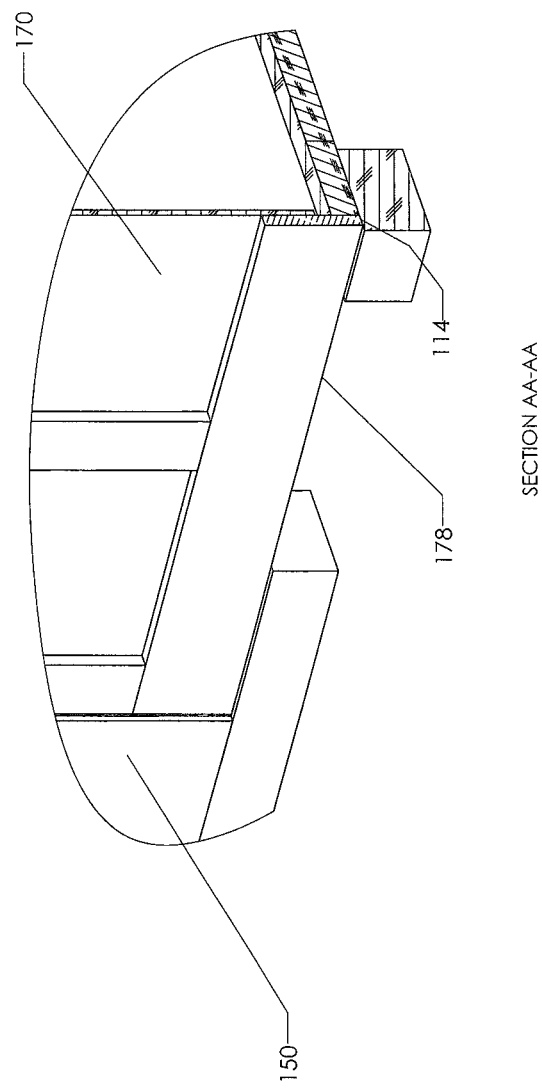
FIG. 24 is a cross-sectional view taken along line AA-AA in FIG. 21.
Figure 25:
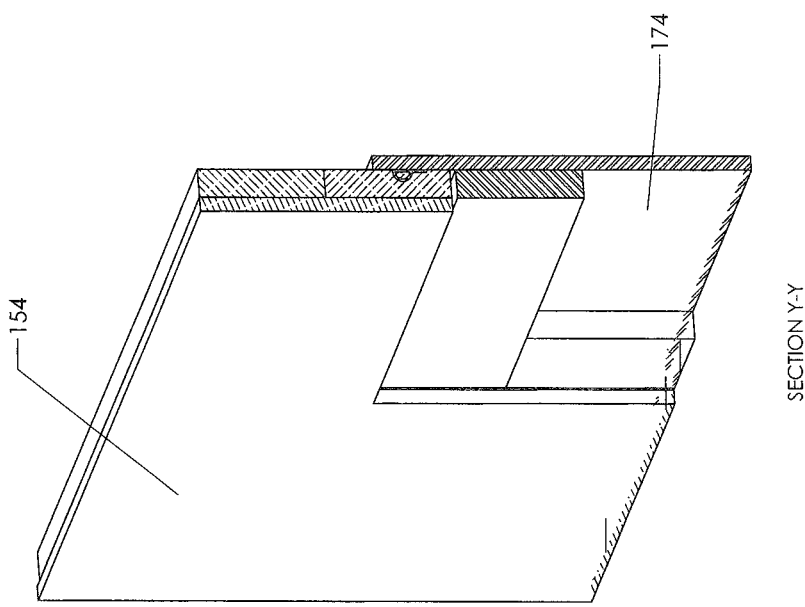
FIG. 25 is a cross-sectional view taken along line Y-Y in FIG. 21.
Figure 26:
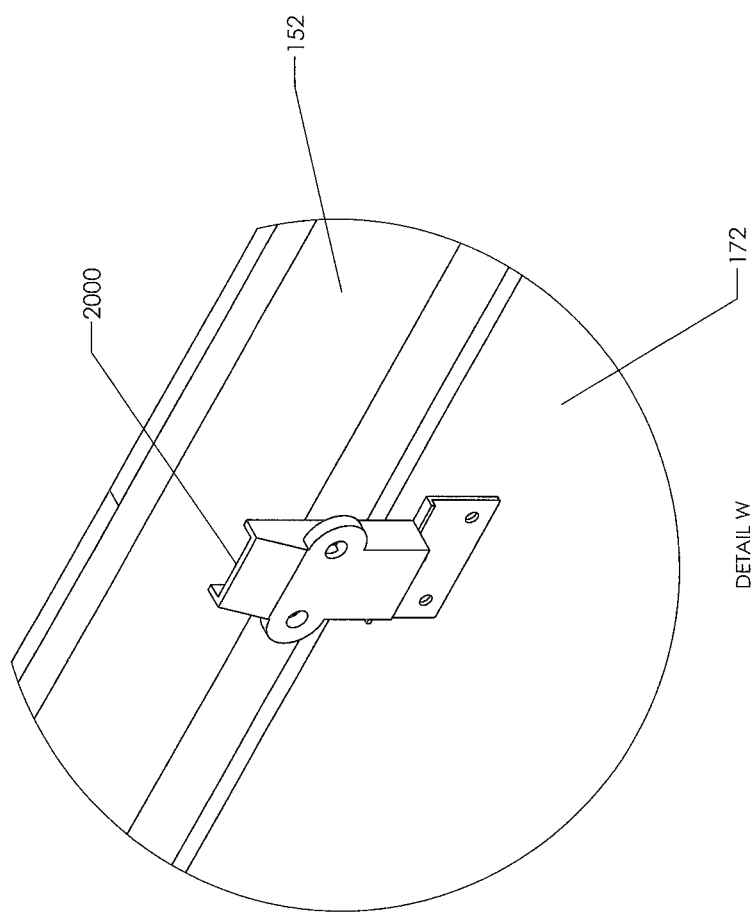
FIG. 26 is a detail view illustrating the locks shown in FIG. 27 in accordance with an embodiment of the application.
Figure 27:
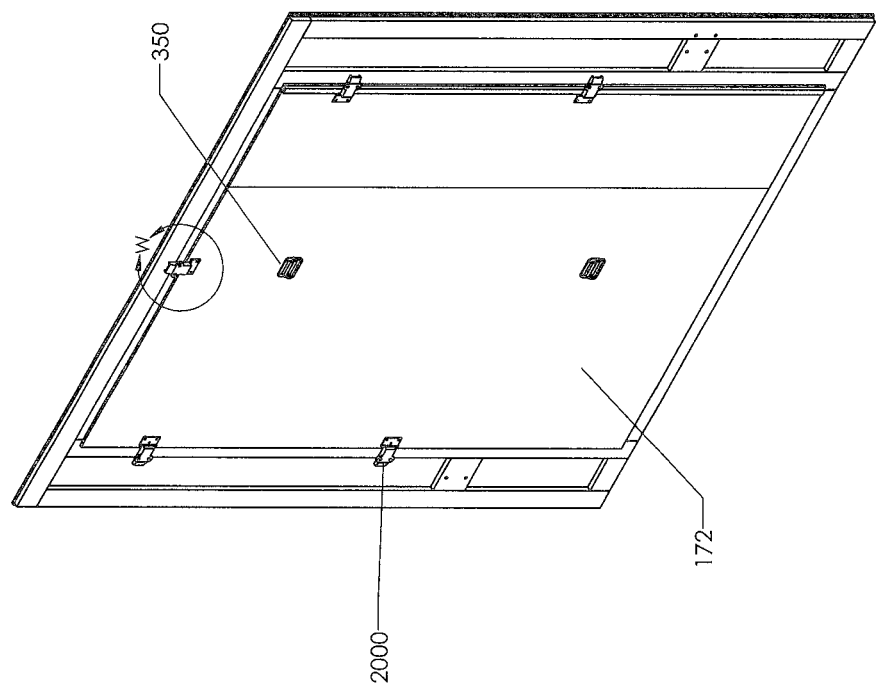
FIG. 27 is a rear perspective view illustrating the back wall of FIG. 21 in accordance with an embodiment of the application.

FIG. 16 is a front view illustrating the back wall 150 of the shipping container 100 of FIG. 1 in accordance with an embodiment of the application. FIG. 16A is a side view illustrating the back wall 150 of the shipping container 100 of FIG. 1 in accordance with an embodiment of the application. FIG. 17 is a cross-sectional view taken along line F-F in FIG. 16. FIG. 18 is a detail view illustrating the seal 169 shown in FIG. 17 in accordance with an embodiment of the application. FIG. 19 is a cross-sectional view taken along line E-E in FIG. 16. FIG. 20 is a rear perspective view illustrating the back wall 150 of FIG. 16 in accordance with an embodiment of the application. FIG. 21 is alternate front view illustrating the back wall 150 of FIG. 16 in accordance with an embodiment of the application. FIG. 22 is a cross-sectional view taken along line F-F in FIG. 21. FIG. 23 is a cross-sectional view taken along line E-E in FIG. 21. FIG. 24 is a cross-sectional view taken along line AA-AA in FIG. 21. FIG. 25 is a cross-sectional view taken along line Y-Y in FIG. 21. FIG. 26 is a detail view illustrating the locks 2000 shown in FIG. 27 in accordance with an embodiment of the application. And, FIG. 27 is a rear perspective view illustrating the back wall 150 of FIG. 21 in accordance with an embodiment of the application.

The back wall 150 may be rectangular in shape having an inner surface 152 facing the inside 190 the container 100 and an outer surface 154 facing the outside 200. Similarly, the back door 170 may be rectangular in shape having an inner surface 172 facing the inside 190 of the container 100 and an outer surface 174 facing the outside 200. Similarly, the back door opening 151 may be rectangular in shape. According to other embodiments, the back door 170 and back door opening 151 may be square in shape, circular in shape, or any other shape.

The back door 170 is mounted over the back door opening 151 in the back wall 150 to close the back door opening 151 from inside 190 the shipping container 100 by first resting a lower edge 178 of the back door 170 on a ledge 114 formed in the upper surface 111 of the base 110 below the back door opening 151 (i.e., at the back door sill 1660) and then resting or pressing an upper portion 176 of the outer surface 174 of the back door 170 against a lower portion 156 of the inner surface 152 of the back wall 150 above the back door opening 151 (i.e., at the back door lintel 1700).

A user or users may position the back door 170 in place using one or more handles 350 (e.g., two handles 350) mounted on the inner surface 172 of the back door 170. The back door 170 is secured or locked in place over the back door opening 151 using one or more locks 2000 (e.g., five locks) mounted along the border or edges 2200 of the inner surface 172 of the back door 170. The hasp of each lock 2000 engages a respective base or protrusion or board mounted on or formed in the inner surface 152 of the back wall 150 (e.g., adjacent the doorjamb 1800 and lintel 1700) adjacent each lock 2000.

A bump seal or seals 169 may be provided along the inner surface 152 of the back wall 150 adjacent to the doorjambs 1800, lintel 1700, and sill 1160 of the back wall 150 at the back door opening 151 and/or along or spaced from the border or edges 2300 of the outer surface 174 of the back door 170 to seal the back door 150 to the back wall 150.

Figure 28:
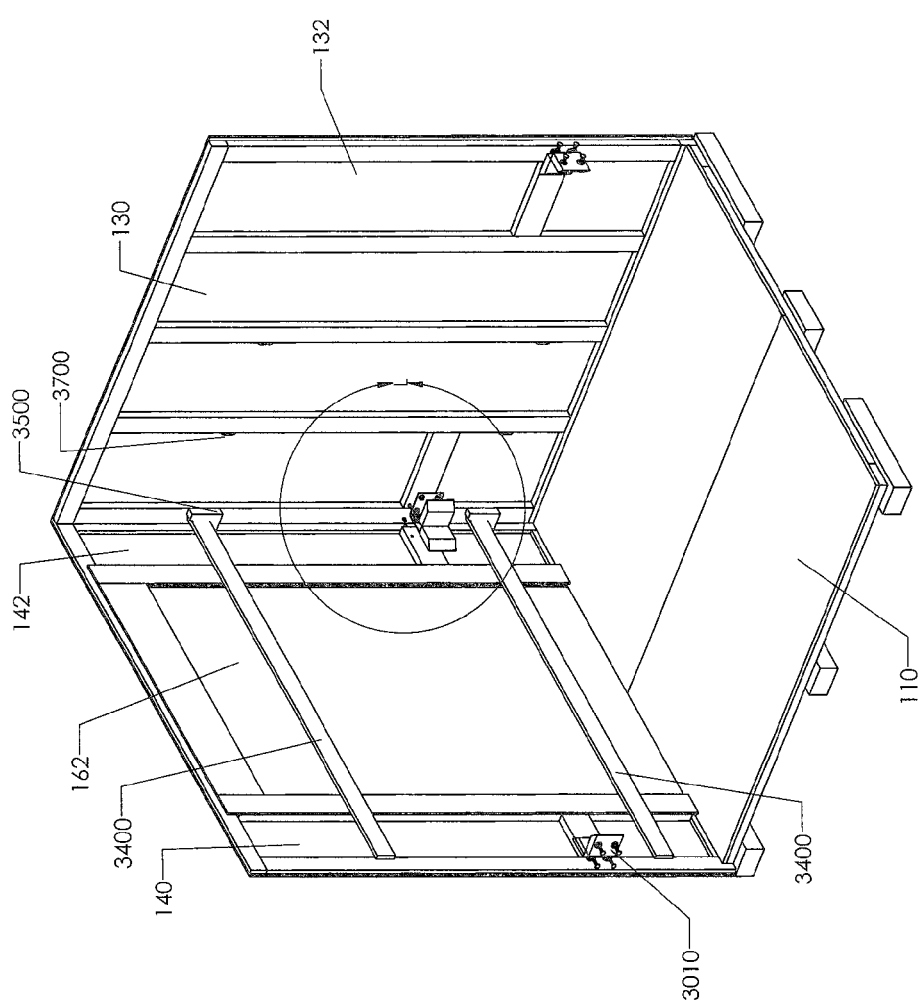
FIG. 28 is a perspective view illustrating the coupling of the front and side walls of the shipping container of FIG. 1 in accordance with an embodiment of the application.
Figure 29:
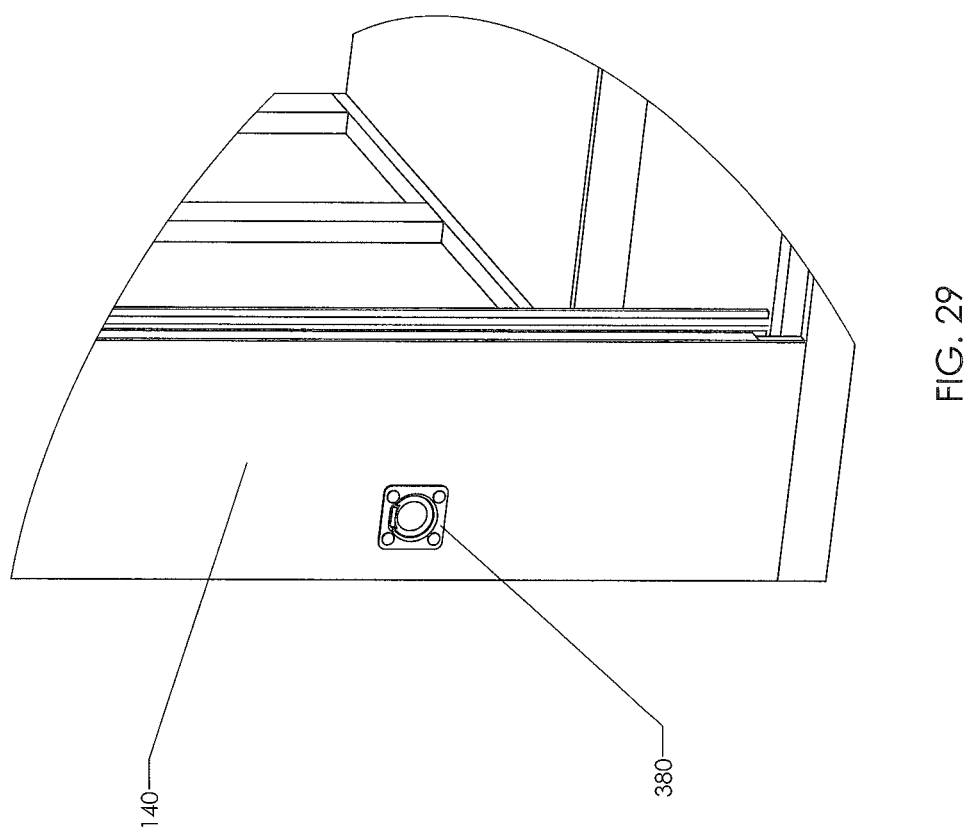
FIG. 29 is a detail view illustrating the D-rings shown in FIG. 3 in accordance with an embodiment of the application.
Figure 30:
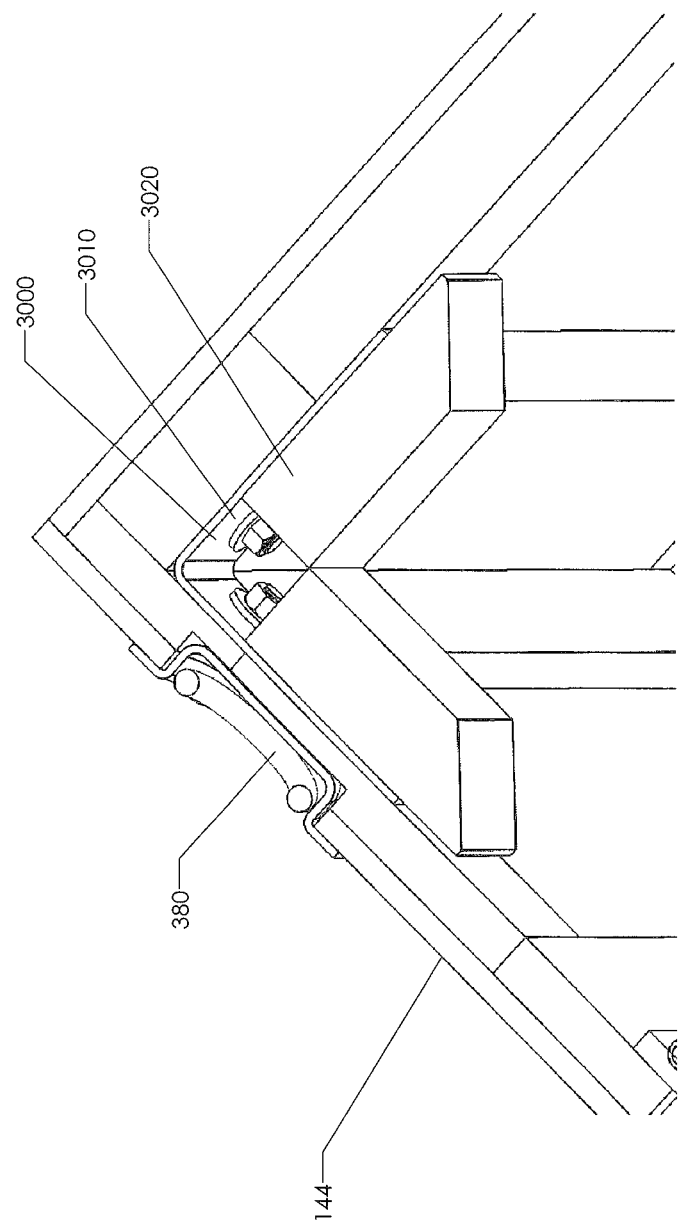
FIG. 30 is a cross-sectional view illustrating the b-rings of FIG. 29.
Figure 31:
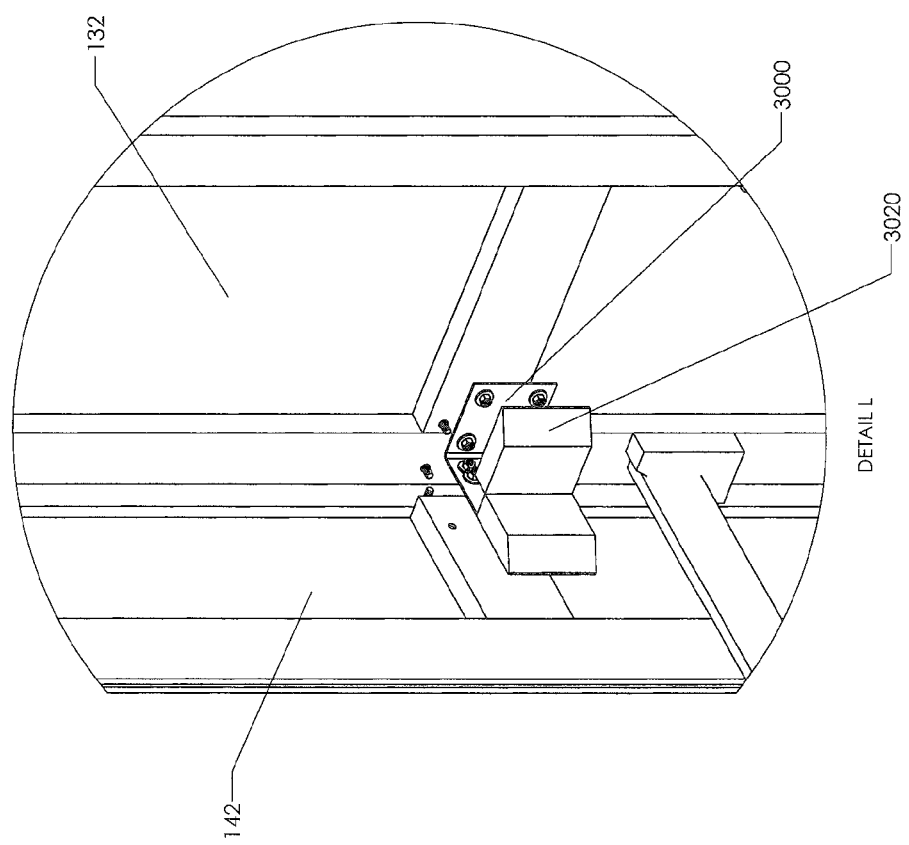
FIG. 31 is a detail view illustrating the coupling of the front and side walls of the shipping container of FIG. 1 in accordance with an embodiment of the application.

FIG. 28 is a perspective view illustrating the coupling of the front and side walls 140, 130 of the shipping container 100 of FIG. 1 in accordance with an embodiment of the application. FIG. 29 is a detail view illustrating the D-rings 380 shown in FIG. 3 in accordance with an embodiment of the application. FIG. 30 is a cross-sectional view illustrating the D-rings 380 of FIG. 29. And, FIG. 31 is a detail view illustrating the coupling of the front and side walls 140, 130 of the shipping container 100 of FIG. 1 in accordance with an embodiment of the application.

The front and back walls 140, 150 may be coupled to the side walls 120, 130 using angled metal reinforcement plates 3000 which may be fastened to the inner surfaces (e.g., 142, 132) of each wall using bolts 3010. A cover plate 3020 may be mounted over each reinforcement plate 3000 and its respective bolts 3010 to reduce damage to freight from scratching. One or more D-rings 380 may be mounted in the outer surfaces 144, 154 of the front and back walls 140, 150 to provide a means of securing the shipping container 100 to a trailer, ship hold, etc., and/or to another shipping container 100 as described below.

Figure 32:
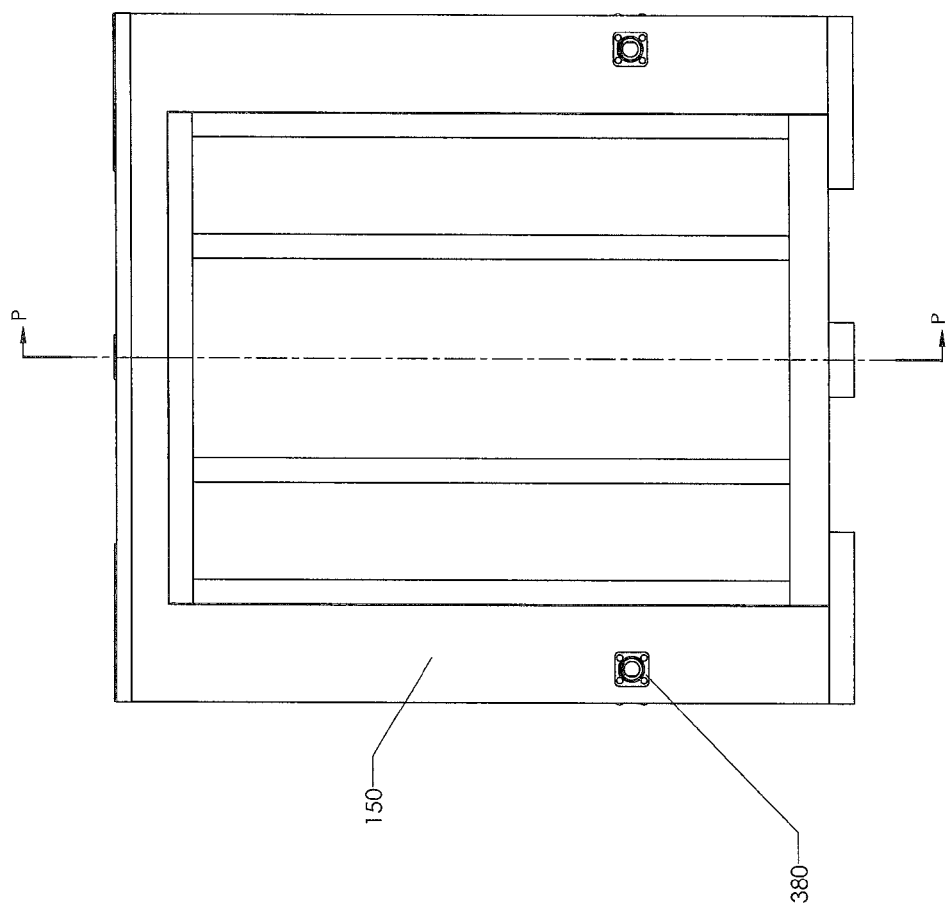
FIG. 32 is alternate front view illustrating the back wall of FIG. 16 in accordance with an embodiment of the application.
Figure 33:
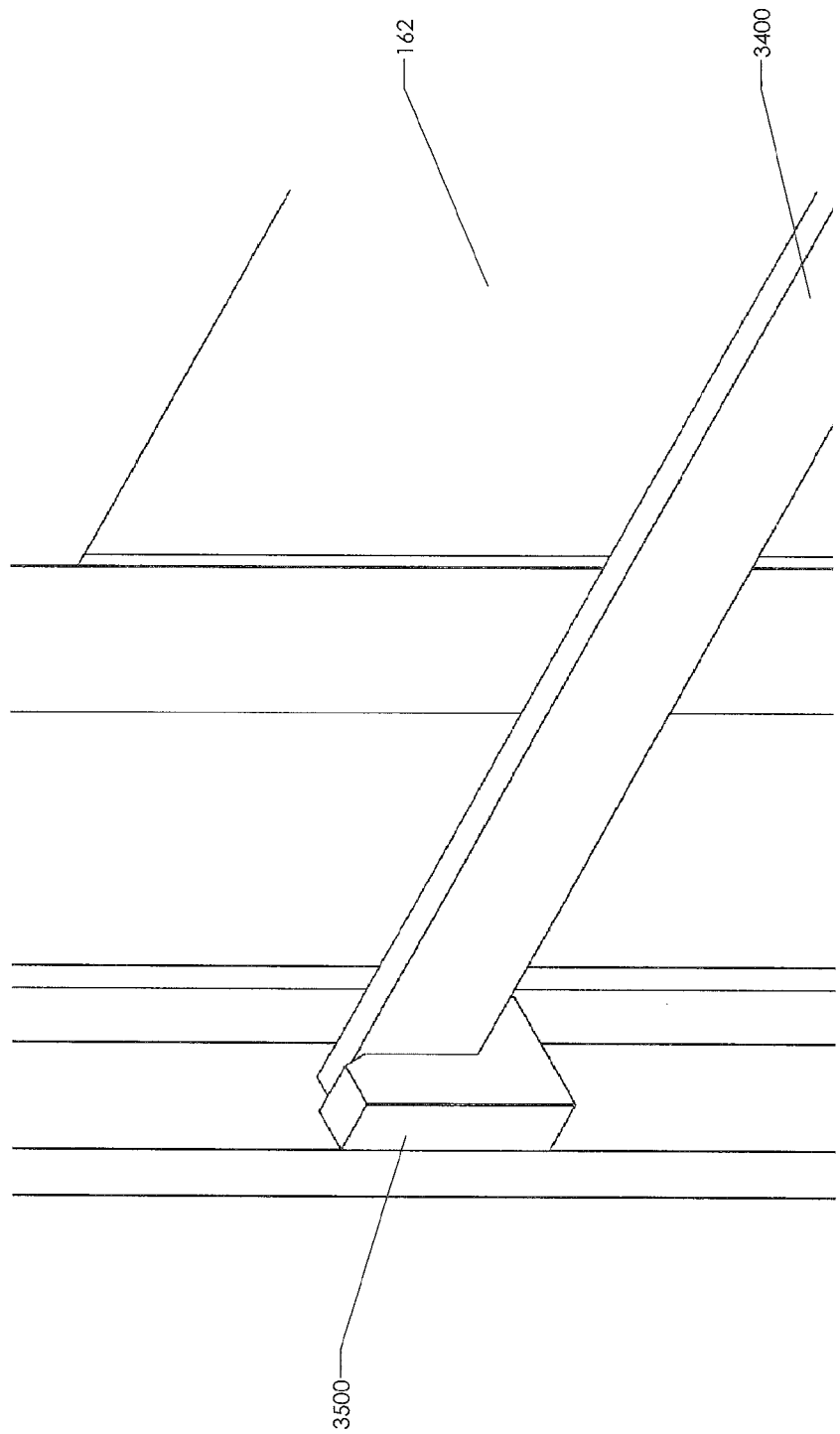
FIG. 33 is a detail view illustrating the removable strapping boards of the front wall of the shipping container of FIG. 1 in accordance with an embodiment of the application.
Figure 34:
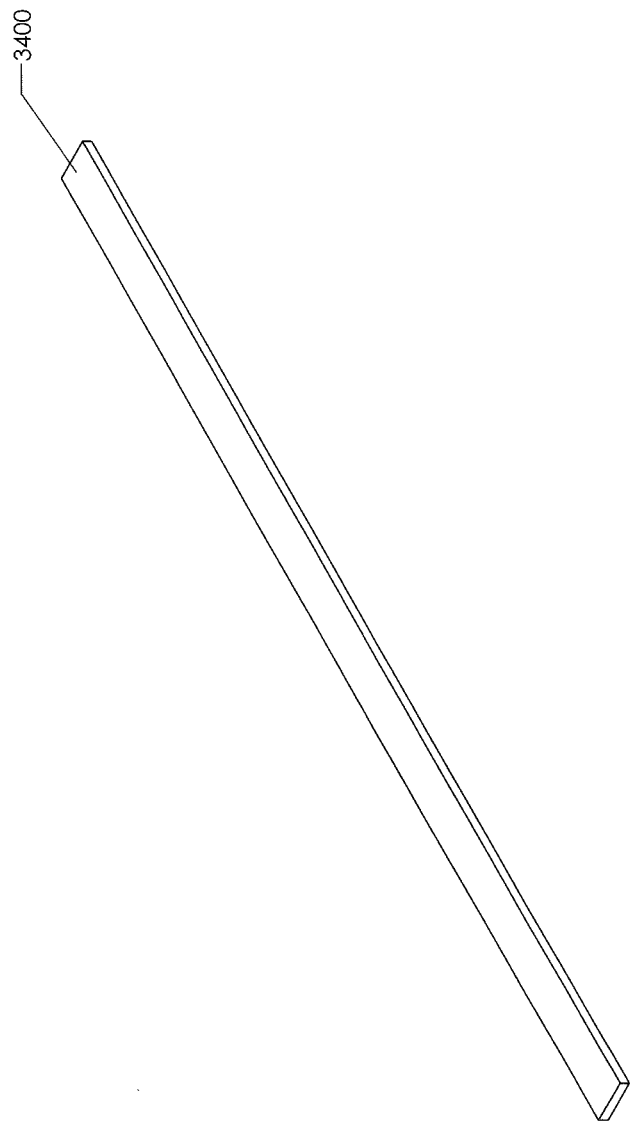
FIG. 34 is a perspective view of a removable strapping board of the front wall of the shipping container of FIG. 1 in accordance with an embodiment of the application.
Figure 35:
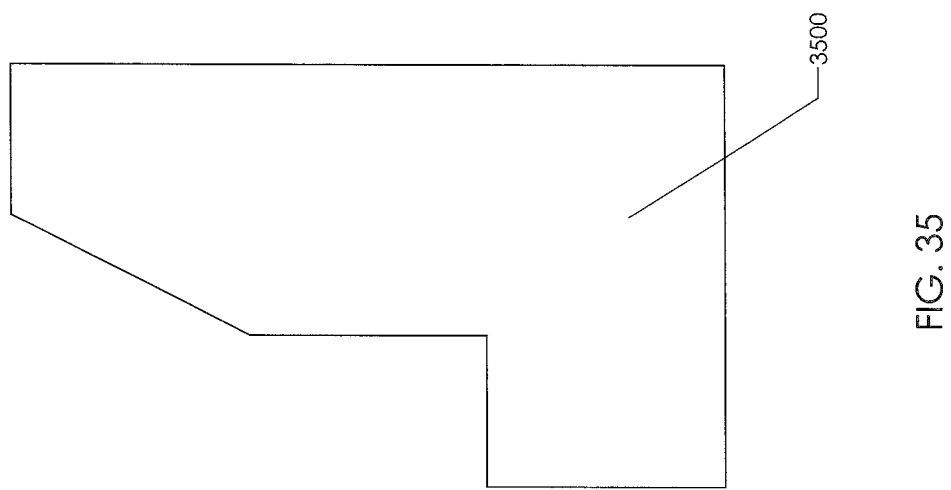
FIG. 35 is a detail view illustrating a support for the removable strapping board of FIG. 34 in accordance with an embodiment of the application.
Figure 36:
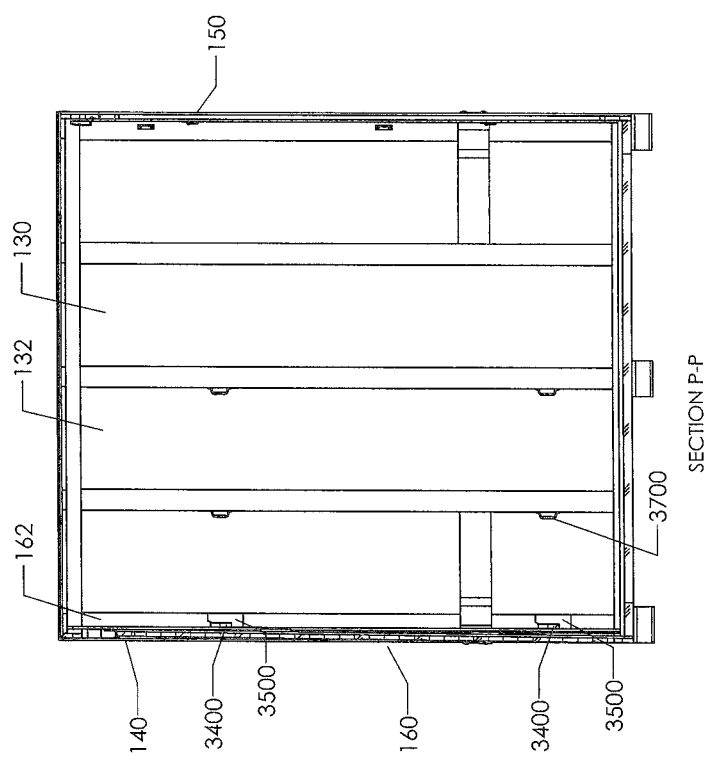
FIG. 36 is a cross-sectional view taken along line P-P in FIG. 32.
Figure 37:
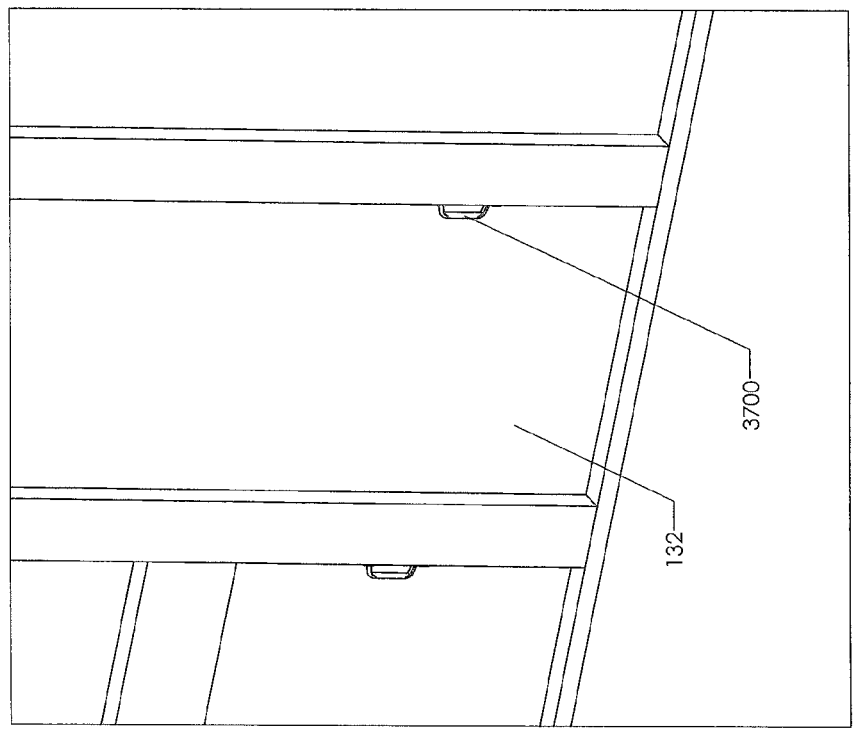
FIG. 37 is a detail view illustrating the handles shown in FIG. 36 in accordance with an embodiment of the application.

FIG. 32 is alternate front view illustrating the back wall 150 of FIG. 16 in accordance with an embodiment of the application. FIG. 33 is a detail view illustrating the removable strapping boards 3400 of the front wall 140 of the shipping container 100 of FIG. 1 in accordance with an embodiment of the application. FIG. 34 is a perspective view of a removable strapping board 3400 of the front wall 140 of the shipping container 100 of FIG. 1 in accordance with an embodiment of the application. FIG. 35 is a detail view illustrating a support 3500 for the removable strapping board 3400 of FIG. 34 in accordance with an embodiment of the application. FIG. 36 is a cross-sectional view taken along line P-P in FIG. 32. And, FIG. 37 is a detail view illustrating the handles 3700 shown in FIG. 36 in accordance with an embodiment of the application.

One or more removable strapping boards 3400 may be mounted between the side walls 120, 130 across the front door opening 141 and behind the front door 160 to secure freight within the shipping container 100 and to prevent freight that may have shifted during transport from coming into contact with the front door 160. Each removable strapping board 3400 may be mounted across the front door opening using a support 3500 attached to the inner surface (e.g., 132) of each side wall (e.g., 130). The inner surface (e.g., 132) of each side wall (e.g., 130) may be further equipped one or more handles 3700 (e.g., four handles) for securing freight within the shipping container 100. These handles 3700 may be used to position freight within the shipping container 100 so as to face the front door 140.

Figure 38:
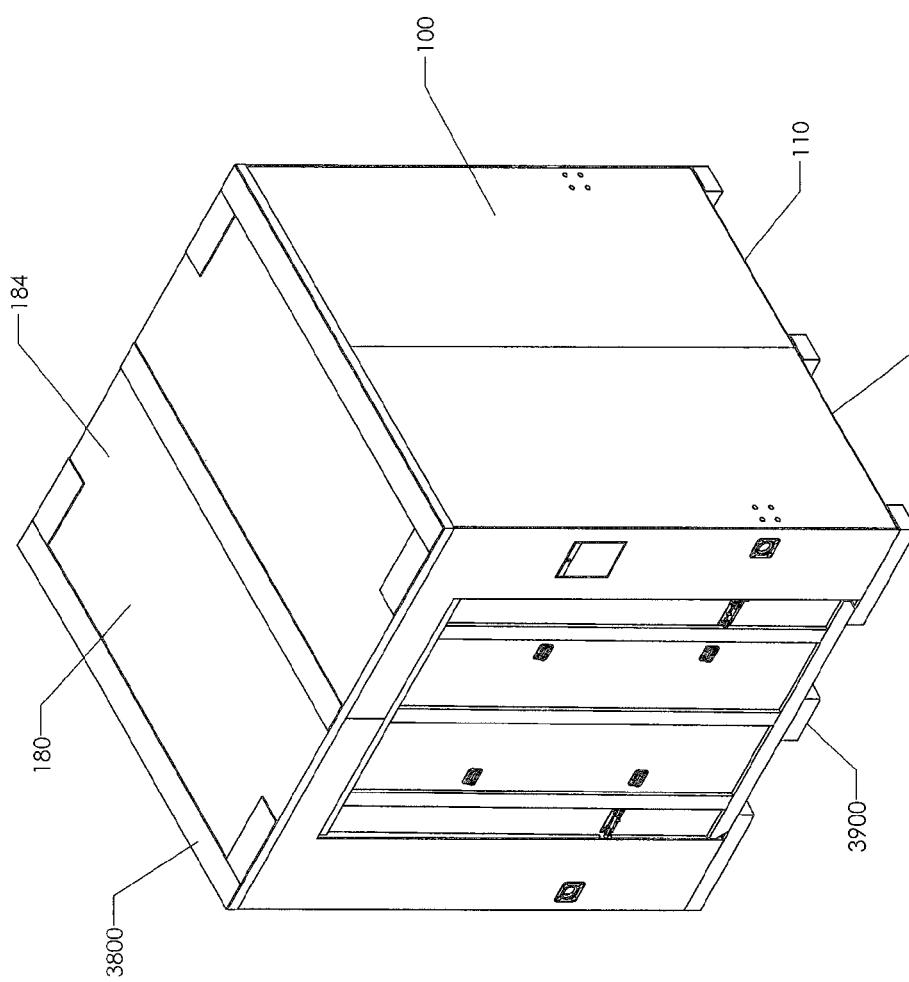
FIG. 38 is a first alternate perspective view illustrating the modular shipping container of FIG. 1 in accordance with an embodiment of the application.
Figure 39:
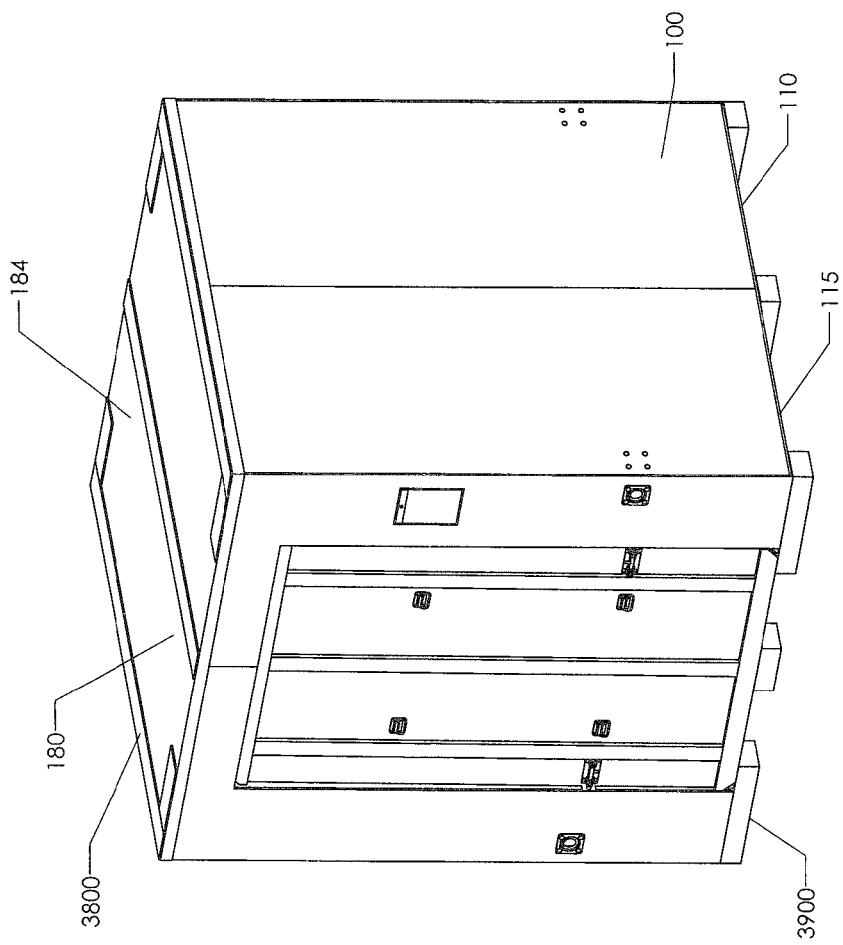
FIG. 39 is a second alternate perspective view illustrating the modular shipping container of FIG. 1 in accordance with an embodiment of the application.

FIG. 38 is a first alternate perspective view illustrating the modular shipping container 100 of FIG. 1 in accordance with an embodiment of the application. And, FIG. 39 is a second alternate perspective view illustrating the modular shipping container 100 of FIG. 1 in accordance with an embodiment of the application. A top skid 3800 may be mounted on the outer surface 184 of the roof 180 to protect the shipping container 100 when it is stacked. A bottom skid 3900 may be mounted on the outer surface 115 of the base 110 to strengthen the base 110 and allow the shipping 100 container to be transported or moved by a forklift. According to one embodiment, at least the outer surface 184 of the roof 180 may be covered with a waterproof skin or coating.

Figure 40:
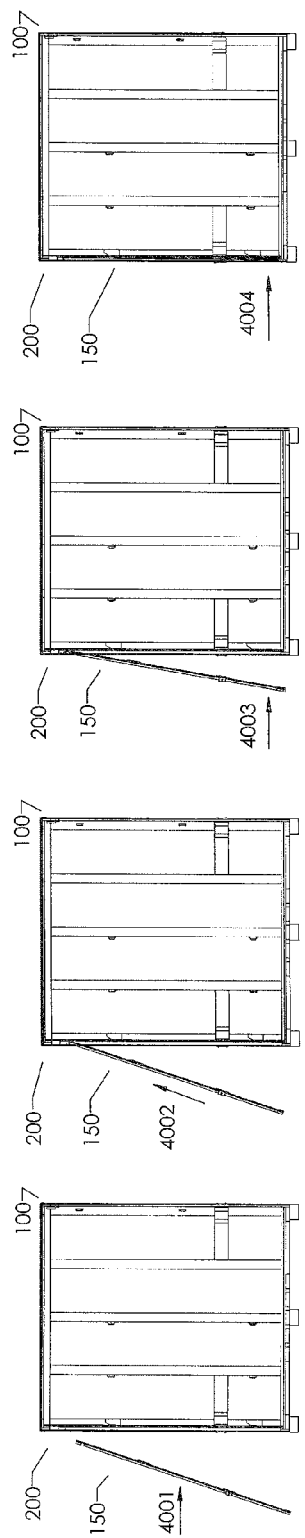
FIG. 40 is a sequence of side views illustrating the installation of the front door in the front wall of the shipping container of FIG. 1 in accordance with an embodiment of the application.

FIG. 40 is a sequence of side views illustrating the installation of the front door 160 in the front wall 140 of the shipping container 100 of FIG. 1 in accordance with an embodiment of the application. In operation, the front door 160 is mounted over the front door opening 141 in the front wall 140 to close the front door opening 141 from outside 200 the shipping container 100 by: first 4001, inclining the upper edge 166 of the front door 160 toward the slot 146 formed in the front wall 140 above the front door 160 (i.e., in the front door lintel 400); second 4002, fitting the upper edge 166 of the front door 160 into the slot 146; third 4003, moving the lower edge 168 of the front door 160 toward the ledge 112 formed in the upper surface 111 of the base 110 below the front door opening 141 (i.e., at the front door sill 360); and, fourth 4004, resting the lower edge 168 of the front door 140 on the ledge 112.

Figure 41:
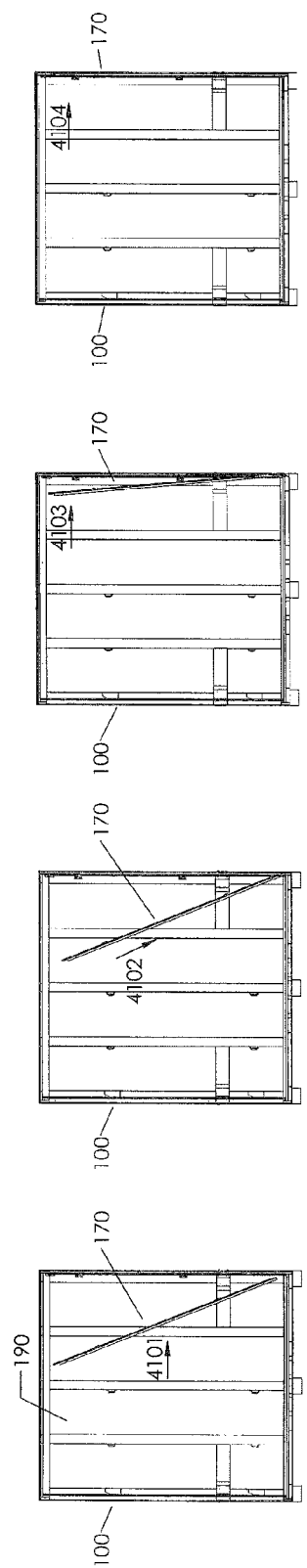
FIG. 41 is a sequence of side views illustrating the installation of the back door in the back wall of the shipping container of FIG. 1 in accordance with an embodiment of the application.

FIG. 41 is a sequence of side views illustrating the installation of the back door 170 in the back wall 150 of the shipping container 100 of FIG. 1 in accordance with an embodiment of the application. In operation, the back door 170 is mounted over the back door opening 151 in the back wall 150 to close the back door opening 151 from inside 190 the shipping container 100 by: first 4101, inclining the lower edge 178 of the back door 170 toward the ledge 114 formed in the upper surface 111 of the base 110 below the back door opening 151 (i.e., at the back door sill 1660); second 4102, resting the lower edge 178 of the back door 170 on the ledge 114; third 4103, moving the upper portion 176 of the outer surface 174 of the back door 170 toward the lower portion 156 of the inner surface 152 of the back wall 150 above the back door opening 151 (i.e., at the back door lintel 1700); and, fourth 4104, resting or pressing the upper portion 176 of the outer surface 174 of the back door 170 against the lower portion 156 of the inner surface 152 of the back wall 150 above the back door opening 151.

Figure 42:
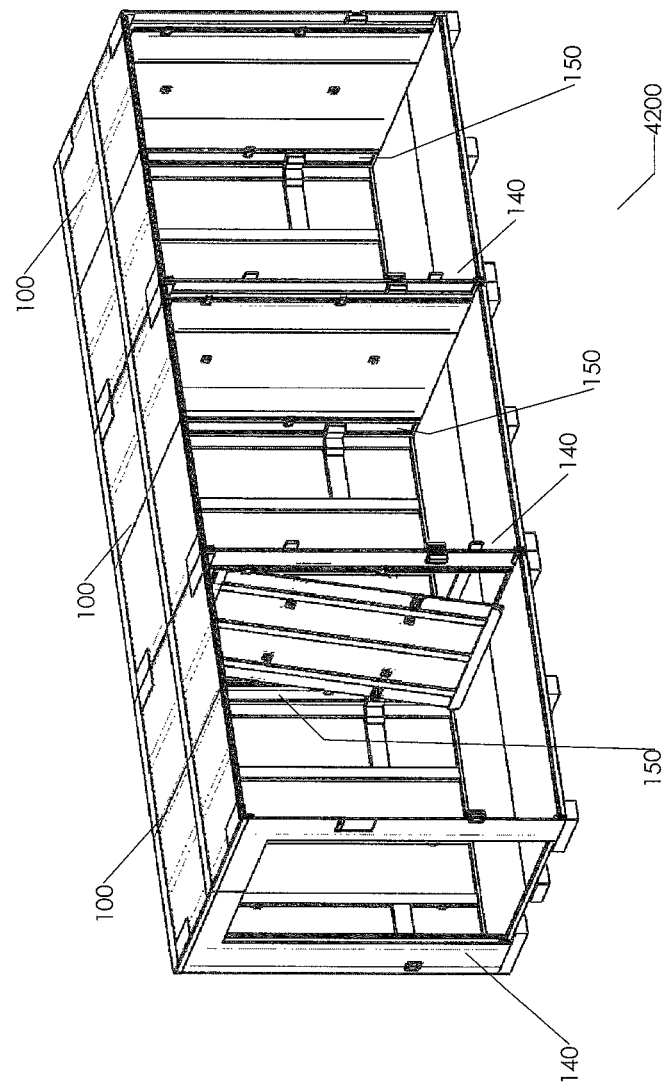
FIG. 42 is a broken-away side perspective view illustrating a shipping container system including three modular shipping containers positioned front wall to back wall in accordance with an embodiment of the application.
Figure 43:
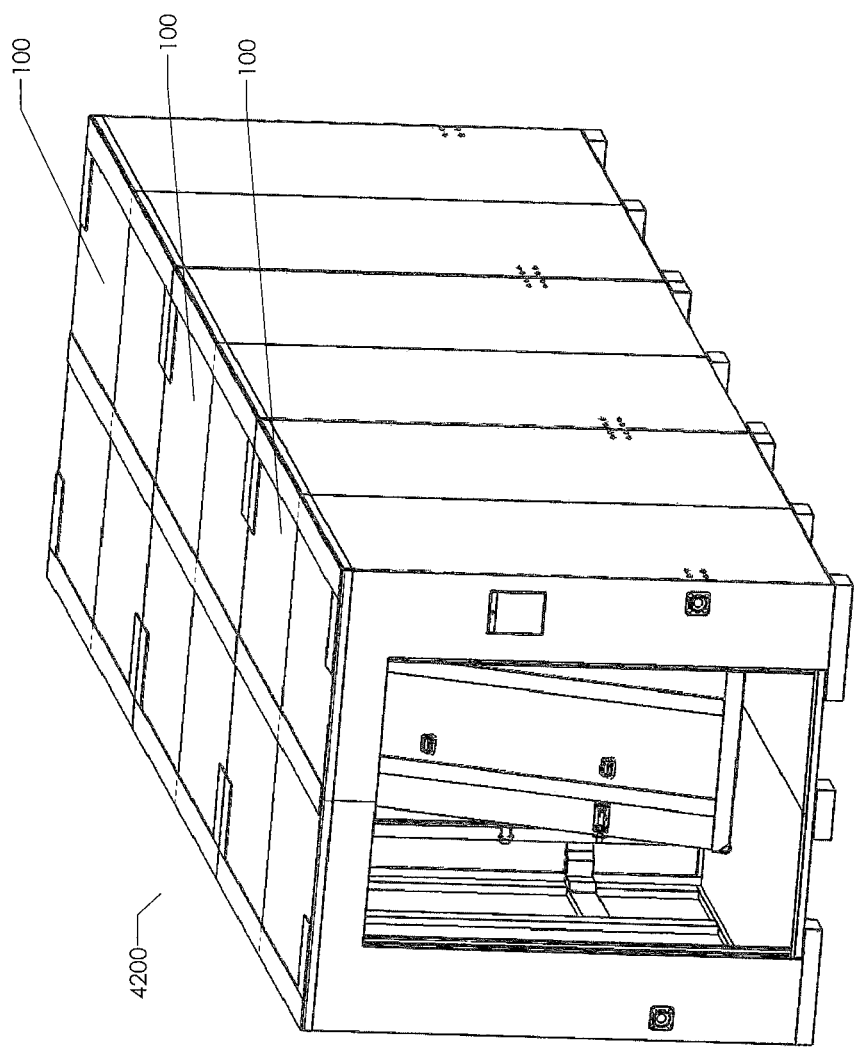
FIG. 43 is a front perspective view illustrating the shipping container system of FIG. 42 in accordance with an embodiment of the application.

FIG. 42 is a broken-away side perspective view illustrating a shipping container system 4200 including three modular shipping containers 100 positioned front wall 140 to back wall 150 in accordance with an embodiment of the application. FIG. 43 is a front perspective view illustrating the shipping container system 4200 of FIG. 42 in accordance with an embodiment of the application. Multiple shipping containers 100 may be placed or positioned front wall 140 to back wall 150 to form a shipping container system 4200. The front door 160 of each shipping container 100 is narrow enough to open inside the open back door 170 of the adjacent shipping container 100 even if the shipping containers 100 forming the system 4200 are misaligned. According to one embodiment, the multiple shipping containers 100 forming the shipping container system 4200 may be coupled together.

Figure 44:
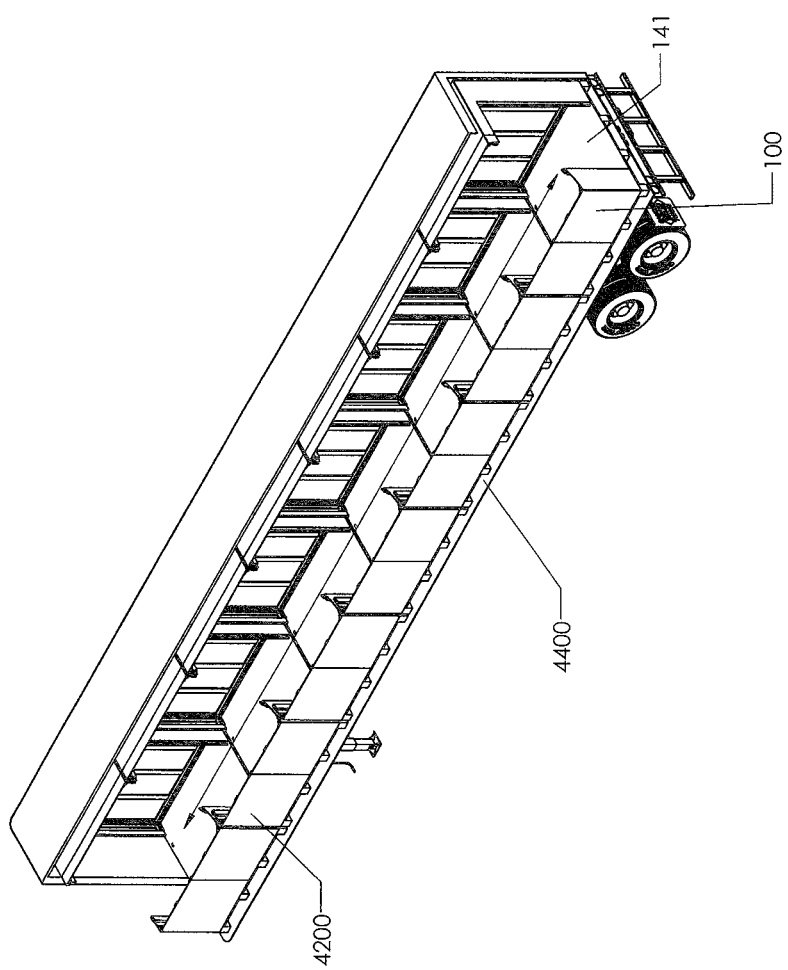
FIG. 44 is a broken-away side perspective view illustrating a shipping container system including seven modular shipping containers mounted on a trailer in accordance with an embodiment of the application; and, FIG. 45 is a side perspective view illustrating a shipping container system including three modular shipping containers positioned side wall to side wall and mounted on a trailer in accordance with an embodiment of the application.

FIG. 44 is a broken-away side perspective view illustrating a shipping container system 4200 including seven modular shipping containers 100 mounted on a trailer 4400 in accordance with an embodiment of the application. The shipping container system 4200 may be mounted on a trailer 4400 or within a larger shipping container. Because the front door 160 of each shipping container 100 is narrow enough to open inside the open back door 170 of the adjacent shipping container 100 even if the shipping containers 100 forming the system 4200 are misaligned, the shipping containers 100 may be loaded or emptied one after the other when installed on a trailer (e.g., a 53 foot trailer) using a single point of access (e.g., a single front door opening 141).

Figure 45:
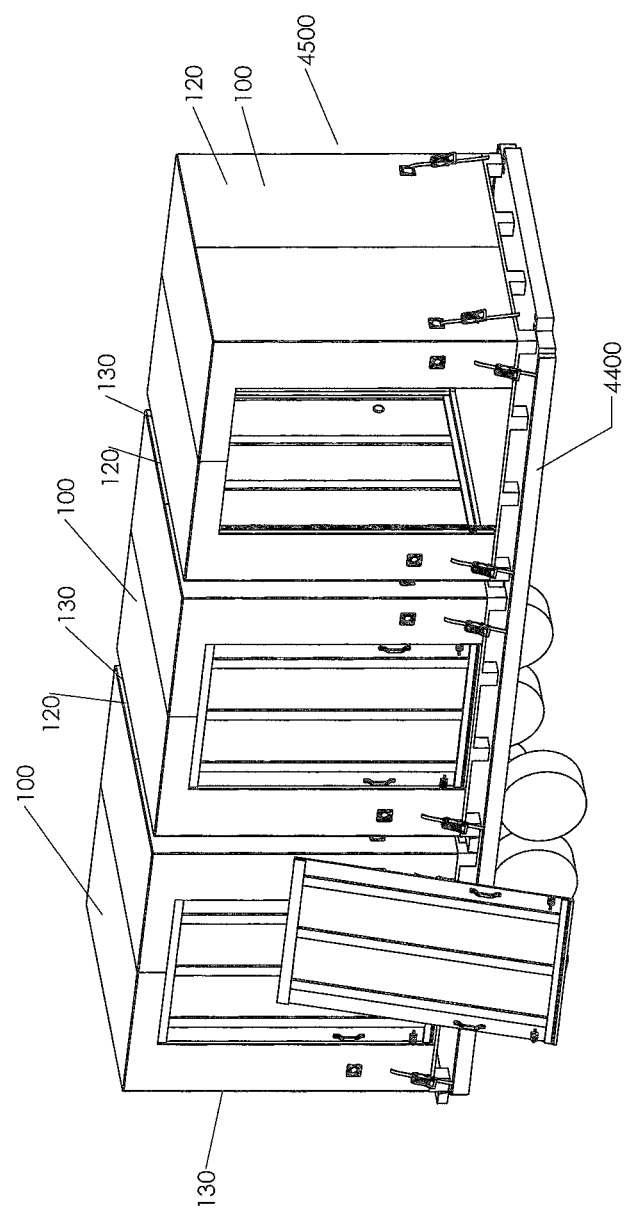

FIG. 45 is a side perspective view illustrating a shipping container system 4500 including three modular shipping containers 100 positioned side wall 120 to side wall 130 and mounted on a trailer 4400 in accordance with an embodiment of the application. According to one embodiment, a shipping container system 4500 may also be formed by mounting multiple shipping containers 100 side wall 120 to side wall 130 on a trailer 4400. In this system 4500, shipping containers 100 are aligned with front doors facing one side of the trailer 4400 and may be loaded from the ground. The trailer 4400 may be a standard flatbed trailer or a standard flatbed truck. According to one embodiment, the multiple shipping containers 100 forming the shipping container system 4500 may be coupled together.

Thus, according to one embodiment, there is provided a modular shipping container 100, comprising: an enclosure 191 having a base 110 opposed and spaced from a roof 180, each of the base 110 and roof 180 coupled to respective ends of opposed and spaced left and right side walls 130, 120 and to opposed and spaced front and back walls 140, 150, the front and back walls 140, 150 having front and back door openings 141, 151 formed therein, respectively; and, front and back doors 160,170 sized for mounting over the front and back door openings 141, 151, respectively, to selectively close the front and back door openings 141, 151; wherein the front door opening 141 and the front door 160 are smaller than the back door opening 151 and the back door 170, respectively, whereby the front door 160 is passable through the back door opening 151.

The above embodiments may contribute to an improved modular shipping container 100 and may provide one or more advantages. First, to increase freight capacity, a number of modular shipping containers 100 may be positioned, placed, or coupled front wall 140 to back wall 150 to form a modular shipping container system 4200. Second, freight may be loaded and removed from the modular shipping container system 4200 by opening the front door 160 of just the first modular shipping container 100 in the system 4200.

The embodiments of the application described above are intended to be exemplary only. Those skilled in this art will understand that various modifications of detail may be made to these embodiments, all of which come within the scope of the application.

What is claimed is:

1. A modular shipping container, comprising:
an enclosure having a base opposed and spaced from a roof, each of the base and roof coupled to respective ends of opposed and spaced left and right side walls and to opposed and spaced front and back walls, the front and back walls having front and back door openings formed therein, respectively; and,
front and back doors sized for mounting over the front and back door openings, respectively, to selectively open and close the front and back door openings;

wherein the front door is hingelessly and removably mountable over the front door opening, and the rear door is hingelessly and removably mountable over the rear door opening;

wherein the front door opening and the front door are accordingly smaller than each of the back door opening and the back door, and whereby the front door is passable through the back door opening.

2. The modular shipping container of claim 1, wherein the front door is configured to be mounted over the front door opening from outside the modular shipping container only.

3. The modular shipping container of claim 2, wherein the back door is configured to be mounted over the back door opening from inside the modular shipping container only.

4. The modular shipping container of claim 3, wherein the front door is rectangular in shape, wherein a slot is formed in the front wall above the front door opening for receiving an upper edge of the front door, and wherein a first ledge is formed in an upper surface of the base below the front door opening for receiving a lower edge of the front door.

5. The modular shipping container of claim 4, wherein the back door is rectangular in shape, wherein a second ledge is formed in an upper surface of the base below the back door opening for receiving a lower edge of the back door, and wherein a portion of an inner surface of the back wall above the back door opening is provided for receiving an upper portion of an outer surface of the back door.

6. The modular shipping container of claim 1, further comprising at least one first fastener for fastening the front door to an outer surface of the front wall.

7. The modular shipping container of claim 6, wherein the at least one first fastener is operable from outside the modular shipping container only.

8. The modular shipping container of claim 6, wherein the at least one first fastener is at least one latch.

9. The modular shipping container of claim 1, further comprising at least one second fastener for fastening the back door to an inner surface of the back wall.

10. The modular shipping container of claim 9, wherein the at least one second fastener is operable from inside the modular shipping container only.

11. The modular shipping container of claim 9, wherein the at least one second fastener is at least one lock.

12. The modular shipping container of claim 1, wherein respective edges of the front and back walls are coupled to respective edges of the left and right side walls.

13. The modular shipping container of claim 1, wherein the front door is a front closure panel and wherein the back door is a back closure panel.

14. The modular shipping container of claim 1, wherein the front door and back door openings are for the loading and removal of freight from within the modular shipping container.

15. The modular shipping container of claim 14, wherein the front and back doors selectively close the front and back door openings to secure the freight within the modular shipping container.

16. The modular shipping container of claim 14, wherein the shipping container is used for at least one of transporting and storing the freight.

17. The modular shipping container of claim 14, wherein the freight is stored on an upper surface of the base within the modular shipping container.

18. A modular shipping container system, comprising:
a first shipping container having a first front wall in which a first front door is mounted over a first front door opening and a first back wall in which a first back door is mounted over a first back door opening;

a second shipping container having a second front wall in which a second front door is mounted over a second front door opening and a second back wall in which a second back door is mounted over a second back door opening;

wherein the respective first and second front doors are hingelessly and removably mountable over the respective first and second front door openings, and the respective first and second rear doors are hingelessly and removably mountable over the respective first and second rear door openings;

wherein the first back wall is positioned adjacent to the second front wall; and wherein the second front door is accordingly smaller than each of the first back door opening and the first back door, and whereby the second front door is passable through the first back door opening.

19. The system of claim 18, wherein the first and second shipping containers are mounted on a trailer.

20. A method for storing freight, comprising:
positioning a first shipping container adjacent to a second shipping container;

wherein the first shipping container has a first front wall in which a first front door is mounted over a first front door opening and a first back wall in which a first back door is mounted over a first back door opening;

wherein the second shipping container has a second front wall in which a second front door is mounted over a second front door opening and a second back wall in which a second back door is mounted over a second back door opening;

said second front door opening having a second front width and a second front height, and said second back door opening having a second back width and a second back height;

wherein the respective first and second front doors are hingelessly and removably mountable over the respective first and second front door openings, and the respective first and second rear doors are hingelessly and removably mountable over the respective first and second rear door openings;

wherein the first back wall is positioned adjacent to the second front wall;

wherein the second front door is accordingly smaller than each of the first back door opening and the first back door; and accessing the freight stored in the second shipping container through the first shipping container.

21. The method of claim 20, wherein the first and second front doors are configured to be mounted over the first and second front door openings from outside the first and second shipping containers only, respectively, and wherein the first and second back doors are configured to be mounted over the first and second back door openings from inside the first and second shipping containers only, respectively.

22. A shipping container, comprising:
an enclosure having opposed first and second walls, the first and second walls having first and second openings formed therein, respectively;

first and second closure panels sized for mounting over the first and second openings, respectively, to selectively open and close the first and second openings;

wherein the first closure panel is hingelessly and removably mountable over the first opening, and the second closure panel is hingelessly and removably mountable over the second opening;

wherein the first opening and the first closure panel are accordingly smaller than each of the second opening and the second closure panel, and whereby the first closure panel is passable through the second opening.

* * * * *